(12) United States Patent
Misumi et al.

(10) Patent No.: US 12,529,574 B2
(45) Date of Patent: Jan. 20, 2026

(54) DISPLAY CONTROL DEVICE AND DISPLAY CONTROL METHOD

(71) Applicant: Nissan Motor Co., Ltd., Kanagawa (JP)

(72) Inventors: Ryuma Misumi, Kanagawa (JP); Masahide Nakamura, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 233 days.

(21) Appl. No.: 18/274,891

(22) PCT Filed: Jan. 29, 2021

(86) PCT No.: PCT/JP2021/003395
§ 371 (c)(1),
(2) Date: Jul. 28, 2023

(87) PCT Pub. No.: WO2022/162909
PCT Pub. Date: Aug. 4, 2022

(65) Prior Publication Data
US 2024/0085209 A1    Mar. 14, 2024

(51) Int. Cl.
*G01C 21/00* (2006.01)
*B60W 50/14* (2020.01)
*B60W 60/00* (2020.01)

(52) U.S. Cl.
CPC ......... *G01C 21/3815* (2020.08); *B60W 50/14* (2013.01); *B60W 60/001* (2020.02); *B60W 2050/146* (2013.01)

(58) Field of Classification Search
CPC ............ G01C 21/3815; G01C 21/3679; G01C 21/3697; B60W 50/14; B60W 60/001; B60W 2050/146; B60W 30/18154; G08G 1/16
See application file for complete search history.

(56) References Cited

U.S. PATENT DOCUMENTS

| | | |
|---|---|---|
| 2016/0335892 A1 | 11/2016 | Okada et al. |
| 2017/0072853 A1 | 3/2017 | Matsuoka et al. |
| 2017/0236415 A1 | 8/2017 | Okabe et al. |
| 2017/0336629 A1 | 11/2017 | Suzuki et al. |
| 2018/0058879 A1 | 3/2018 | Tayama et al. |

(Continued)

FOREIGN PATENT DOCUMENTS

| | | |
|---|---|---|
| JP | 2007-233770 A | 9/2007 |
| JP | 2015-170223 A | 9/2015 |

(Continued)

*Primary Examiner* — Donald J Wallace
*Assistant Examiner* — Paysun Wu
(74) *Attorney, Agent, or Firm* — Osha Bergman Watanabe & Burton LLP

(57) ABSTRACT

A display control device includes a controller (30). The controller (30) acquires a travel route of a subject vehicle having an autonomous traveling function, acquires information on a state of surroundings of the subject vehicle, performs, based on the state of surroundings of the subject vehicle, safety check required for the subject vehicle to travel on the travel route by autonomous traveling, and causes a display device (31) to display a travel route image including a first range being completed in safety check and a second range other than the first range that are distinguished on the travel route.

16 Claims, 13 Drawing Sheets

(56) References Cited

U.S. PATENT DOCUMENTS

| | | | |
|---|---|---|---|
| 2018/0197299 A1 | 7/2018 | Sugita et al. | |
| 2021/0157325 A1* | 5/2021 | Beller | B60W 60/001 |
| 2022/0105959 A1* | 4/2022 | Hartnett | B60W 50/0097 |
| 2022/0130296 A1* | 4/2022 | Kamiya | B60K 35/235 |

FOREIGN PATENT DOCUMENTS

| | | |
|---|---|---|
| JP | 2016-182891 A | 10/2016 |
| JP | 2017-058868 A | 3/2017 |
| JP | 2017-182588 A | 10/2017 |
| JP | 2017-211366 A | 11/2017 |
| JP | 2018-112887 A | 7/2018 |
| JP | 2019-027996 A | 2/2019 |
| JP | 2020-185830 A | 11/2020 |
| WO | 2016/113891 A1 | 7/2016 |

* cited by examiner

DISPLAY CONTROL DEVICE AND DISPLAY CONTROL METHOD

TECHNICAL FIELD

The present invention relates to a display control device and a display control method.

BACKGROUND ART

An on-vehicle display device that displays a stopped state of a subject vehicle having an automatic driving function is known (Patent Literature 1). This on-vehicle display device causes a display device to display a stop indication extending upward from a road surface in the state of surroundings, when the subject vehicle will be in a stopped state in the future in the state of surroundings during automatic driving.

CITATION LIST

Patent Literature

Patent Literature 1: JP2019-27996A

SUMMARY OF INVENTION

Technical Problem

In the on-vehicle display device described in Patent Literature 1, although the stop indication can be displayed, there is a problem that it is difficult for viewers to intuitively grasp a range for which safety check has been completed.

The problem to be solved by the present invention is to provide a display control device and a display control method, which enable viewers to intuitively grasp the range for which safety check has been completed.

Solution to Problem

The present invention solves the above-described problem by acquiring a travel route of a subject vehicle having an autonomous traveling function, acquiring information on a state of surroundings of the subject vehicle, performing, based on the state of surroundings of the subject vehicle, safety check required for the subject vehicle to travel on the travel route by autonomous traveling, and causing a display device to display a travel route image including a first range being completed in safety check and a second range other than the first range that are distinguished on the travel route.

Advantageous Effects of Invention

According to the present invention, viewers can intuitively grasp, from the travel route image, the range for which the safety check has been completed.

DESCRIPTION OF EMBODIMENTS

Hereinafter, embodiments of the present invention will be described with reference to attached drawings.

Automatic driving in this specification means a state in which a driving assistance apparatus 1 autonomously performs traveling control (including steering control and speed control) of a subject vehicle. That is, the automatic driving in this specification includes fully automatic driving in which the steering and speed of the subject vehicle are all autonomously controlled without any involvement of occupants, and driving assistance in which at least one of the steering and speed of the subject vehicle is autonomously controlled. The automatic driving may be preceding vehicle follow-up control, inter-vehicle distance control, traffic lane departure prevention control, or the like. On the other hand, manual driving in this specification means a driving state in which the steering and speed of the subject vehicle are all operated by a driver. In the following description, it is assumed that vehicles travel on the left side.

Figure 1:
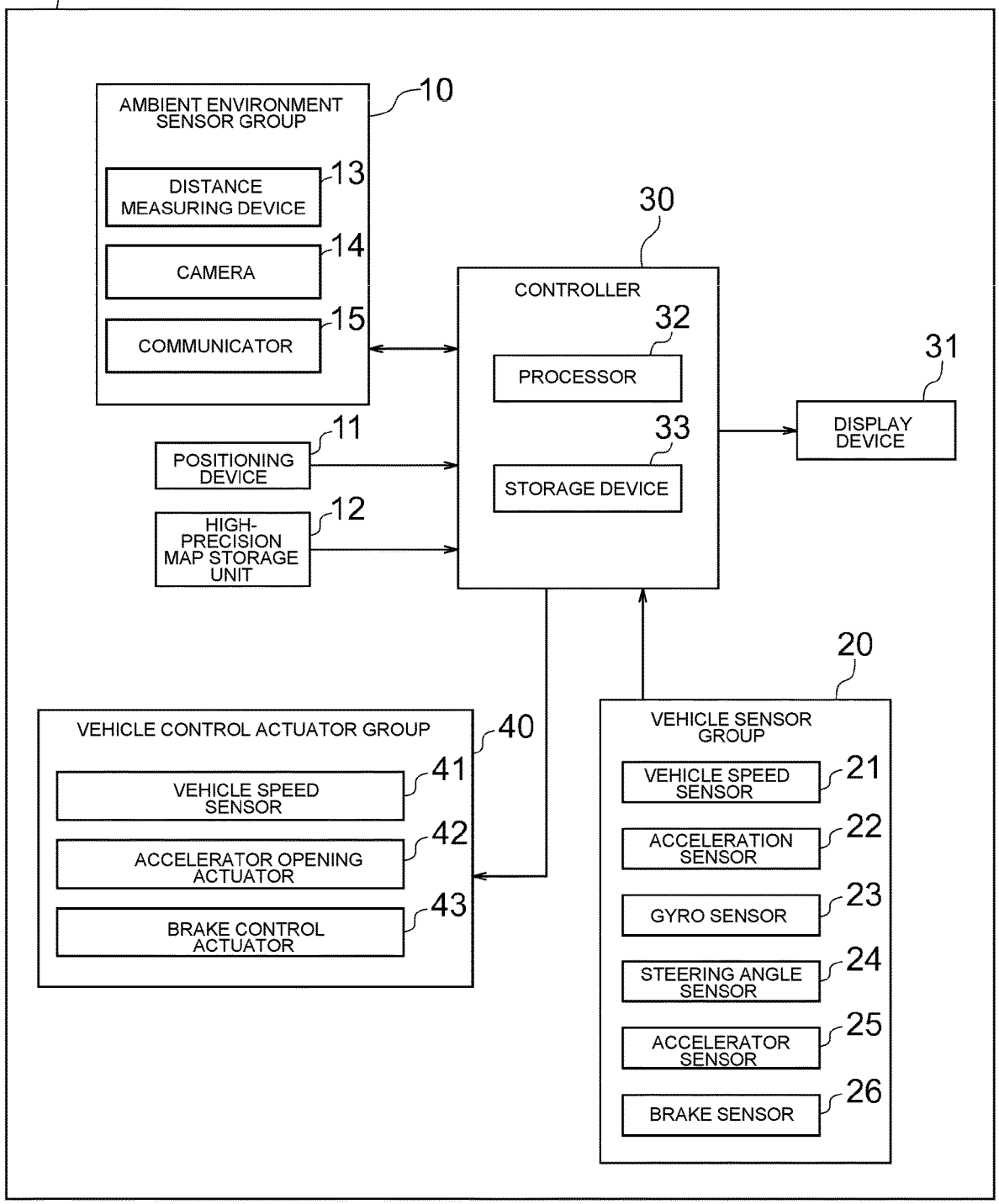
FIG. 1 is a block diagram illustrating an exemplary driving assistance apparatus according the present embodiment.

A display control device according to the present embodiment is implemented as part of the driving assistance apparatus 1, as illustrated in FIG. 1. FIG. 1 is a block diagram illustrating an example of the driving assistance apparatus 1 according to the present embodiment. The driving assistance apparatus 1 performs automatic driving control for the subject vehicle based on a traveling environment around the vehicle (hereinafter, referred to as "subject vehicle") mounting the driving assistance apparatus 1. The subject vehicle can travel under automatic driving control by the driving assistance apparatus 1 or by manual driving of the driver.

The driving assistance apparatus 1 includes an ambient environment sensor group 10, a positioning device 11, a high-precision map storage unit 12, a vehicle sensor group 20, a controller 30, a display device 31, and a vehicle control actuator group 40. Among them, for example, the controller 30 can configure the display control device according to the present embodiment of the present invention.

The ambient environment sensor group 10 is a sensor group for detecting objects around the subject vehicle. The objects are, for example, road lane borderlines, center lines, road markings, median dividers, guardrails, curbs, highway sidewalls, traffic signs, traffic lights, pedestrian crossings, construction sites, accident scenes, and speed limit displays.

The objects further include vehicles other than the subject vehicle (other vehicle such as preceding vehicles and oncoming vehicles), motorcycles, bicycles, and pedestrians. The objects also include obstacles (e.g., vehicles parked or stopped on roads) that may affect traveling of the subject vehicle.

The ambient environment sensor group 10 includes a distance measuring device 13, a camera 14, and a communicator 15. For example, the objects can be detected by the distance measuring device 13, the camera 14, and the communicator 15. The distance measuring device 13 is a device for calculating the relative position of an object with respect to the subject vehicle, and also the relative distance and relative speed between the subject vehicle and the object. Examples of the distance measuring device 13 include radar devices, or sonars, such as laser radars, millimeter wave radars (LRF, etc.), light detection and ranging ((LiDAR) units, ultrasonic radars. The subject vehicle may include a plurality of distance measuring devices 13, which may be arranged on front end, right side, left side, and rear end of the subject vehicle, for example. As a result, for each object around the subject vehicle, it is possible to accurately calculate the relative position of the object with respect to the subject vehicle as well as the relative distance and relative speed between the subject vehicle and the object. Detection results detected by the distance measuring device 13 are output, as information on the ambient environment of the subject vehicle, to the controller 30. In this specification, terms "ambient environment" and "state of surroundings" are regarded as synonymous words and, in the following description, the term "information on the ambient environment" may be read as the term "information on the state of surroundings".

The camera 14 is a device for recognizing objects around the subject vehicle from images. Examples of the camera 14 include cameras having image sensor elements such as CCDs, ultrasonic cameras, and infrared cameras. Information on the objects recognized by the camera 14 is, for example, type of each object, color of the object (e.g., blue, yellow, and red lighting colors of the traffic light), relative position of the object with respect to the subject vehicle, and the relative distance between the subject vehicle and the object. The subject vehicle may include a plurality of cameras 14, which may be arranged in a front grill part of the subject vehicle, under right and left door mirrors, and near a rear bumper, for example. As a result, it is possible to reduce blind spots when recognizing objects around the subject vehicle. The detection results detected by the camera 14 are output, as information on the ambient environment of the subject vehicle, to the controller 30.

The distance measuring device 13 and the camera 14 output, at predetermined time intervals, information on the ambient environment of the subject vehicle to the controller 30. The detection results of the distance measuring device 13 and the camera 14 can be integrated or combined by the controller 30, so that information on objects lacking in detection results can be complemented. For example, the controller 30 can calculate information on the position of the object based on below-described positioning information (self-position information) representing the present position of the subject vehicle output from the positioning device 11 and the relative position (distance and direction) between the subject vehicle and the object detected by the distance measuring device 13 or the camera 14. Alternatively, the information on the position of the object may be calculated by associating high-precision map information stored in the high-precision map storage unit 12, positioning information obtained by an odometry, and the relative position (distance and direction) between the subject vehicle and the object. The controller 30 obtains information on the ambient environment of the subject vehicle by integrating the calculated information on the position of the object with a plurality of pieces of information such as the detection results of the distance measuring device 13 and the camera 14 and the high-precision map information. In addition to the above, the controller 30 can use the detection results of the distance measuring device 13 and the camera 14 and the high-precision map information to recognize objects around the subject vehicle and predict their movements.

The communicator 15 is a device for recognizing, by wireless communication, objects around the subject vehicle, and is equipment connected to the Internet using communication standards such as 4G/LTE and WiFi (registered trademark). Further, the communicator 15 is equipment compatible with communication standards for vehicle-to-vehicle communications with other vehicles and communication standards for road-to-vehicle communications with roadside machines. For example, the communicator 15 receives, at predetermined time intervals, traffic congestion information (congestion locations or the like), accident information (accident locations or the like), and other information from a traffic information center. Further, for example, the communicator 15 performs, at predetermined time intervals, vehicle-to-vehicle communications with other vehicles around the subject vehicle, and receives, from these other vehicles, information such as relative positions of these other vehicles with respect to the subject vehicle and relative speeds between the subject vehicle and these other vehicles. Further, for example, the communicator 15 performs, at predetermined time intervals, road-to-vehicle communications with roadside machines (e.g., traffic lights) around the subject vehicle, and receives, from the roadside machines, information such as relative positions of the traffic lights with respect to the subject vehicle, lighting colors of the traffic lights, and lighting times (lighting cycles) of the traffic lights. Detection results detected by the communicator 15 are output, as information on the ambient environment of the subject vehicle, to the controller 30.

The positioning device 11 is a device for measuring the present position of the subject vehicle, and is, for example, a global positioning system (GPS) receiver. The positioning device 11 may measure the present position of the subject vehicle based on satellite signals of other satellite positioning systems such as a global navigation satellite system (GLONASS). The positioning device 11 may be an inertial navigation system. The positioning device 11 receives, at predetermined time intervals, satellite signals from satellite positioning systems and measures the present position of the subject vehicle. Measurement results of the positioning device 11 are output to the controller 30.

The high-precision map information stored in the high-precision map storage unit 12 is map information with higher accuracy than conventional navigation map information, and includes traffic lane-level information that is more detailed than road-level information. For example, the high-precision map information includes, as the traffic lane-level information, traffic lane node information indicating a reference point such as an intersection or the like on a lane reference line (e.g., center line), and traffic lane link information indicating a section state of a traffic lane between traffic lane nodes. The traffic lane node information includes traffic lane node identification number, position coordinates, total number of connected traffic lane links, and identification number of each connected traffic lane link. The traffic lane link information includes traffic lane link identification number, traffic lane type, traffic lane borderline type, traffic lane shape, and lane reference line shape. Further, the high-precision map information includes type and position coordinates of ground objects such as traffic lights, stop lines, traffic signs (traffic rules), buildings, utility poles, curbs, pedestrian crossings, and walls, which exist on or near traffic lanes, and information on the ground objects such as traffic lane node identification number and traffic lane link identification number corresponding to the position coordinates of the ground objects. In the present embodiment, although the exemplary configuration in which the high-precision map information is stored in the high-precision map storage unit 12 is described, the location where the high-precision map information is stored is not limited to the subject vehicle. The high-precision map information may be stored in a readable state in a recording medium provided in a server. In this case, the controller 30 acquires the high-precision map information, via the communicator 15, from the recording medium provided in the server.

In addition, the high-precision map information includes information on a traveling path boundary including a boundary between a traveling path on which the subject vehicle travels and other areas. The traveling path on which the subject vehicle travels is a road on which the subject vehicle travels, and the shape of the traveling path is not particularly limited. The traveling path has boundaries on the left and right sides thereof in the advancing direction of the subject vehicle. The shape of each traveling path boundary is not particularly limited. Examples of the traveling path boundaries include road markings (traffic lane borderlines, center lines, or the like), and on-road structures (median dividers, guardrails, curbs, tunnels, highway sidewalls, or the like). The high-precision map information includes traveling path boundaries set in advance for spots (e.g., areas in intersections) where traveling path boundaries cannot be clearly identified. The preliminarily set traveling path boundaries are imaginary traveling path boundaries and are not road markings or on-road structures that are actually present. For example, the high-precision map information includes imaginary traveling path boundaries in intersections for each case of going straight, turning left, and turning right.

The vehicle sensor group 20 includes sensors for detecting a traveling state of the subject vehicle and sensors for detecting a driver's driving operation. The sensors for detecting the traveling state of the subject vehicle include a vehicle speed sensor 21, an acceleration sensor 22, and a gyro sensor 23. The sensors for detecting the driving operation include a steering angle sensor 24, an accelerator sensor 25, and a brake sensor 26.

The vehicle speed sensor 21 detects wheel speeds of the subject vehicle and calculates the speed of the subject vehicle based on the detected wheel speeds. The acceleration sensor 22 detects acceleration in the back-and-forth direction, acceleration in the vehicle width direction, and acceleration in the up-and-down direction of the subject vehicle. The gyro sensor 23 detects the angular speed of the rotation angle of the subject vehicle around three axes including roll, pitch, and yaw axes.

The steering angle sensor 24 detects the present steering angle, which is the present rotation angle (amount of steering operation) of a steering wheel serving as a steering operator. The accelerator sensor 25 detects the amount of accelerator operation (accelerator opening degree) by the driver. The brake sensor 26 detects the amount of brake operation by the driver. The speed, acceleration, angular speed, steering angle, amount of accelerator operation (accelerator opening degree), amount of brake operation of the subject vehicle detected by respective sensors of the vehicle sensor group 20 are information collectively referred to as "vehicle information". The vehicle sensor group 20 outputs the vehicle information to the controller 30.

The vehicle control actuator group 40 is an on-vehicle computer group such as an electronic control unit (ECU) and controls on-vehicle equipment that governs traveling of the subject vehicle. The vehicle control actuator group 40 includes a steering actuator 41 that controls the steering operation of the subject vehicle, and also includes an accelerator opening actuator 42 and a brake control actuator 43 that control the traveling speed of the subject vehicle. The steering actuator 41, the accelerator opening actuator 42, and the brake control actuator 43 autonomously control operations of a steering device, a driving device, and a braking device, according to control signals input from the controller 30. As a result, the subject vehicle can autonomously travel along a travel route generated by the controller 30.

The steering actuator 41 performs steering actuator control for controlling steerable wheels according to the steering angle of the steering wheel (so-called handle). In an automatic driving mode, the steering actuator 41 receives a control signal according to a target steering direction, a target steering angle, and a target steering amount from the controller 30. Based on the input control signal, the steering actuator 41 autonomously controls the operation of the steering actuator in such a manner that the subject vehicle travels while maintaining a predetermined lateral position (position of the subject vehicle in left-and-right direction) with respect to the travel route calculated by the controller 30.

The accelerator opening actuator 42 controls the accelerator opening degree of the subject vehicle, under the control of an electric motor and/or an internal combustion engine, which are driving sources for traveling of the subject vehicle, a power transmission device that includes a drive shaft and an automatic transmission cooperatively transmitting the outputs of these driving sources for traveling to driving wheels, and the driving device for controlling the power transmission device. The brake control actuator 43 controls the braking device so that the wheels of the subject vehicle can be braked. In the automatic driving mode, the accelerator opening actuator 42 and the brake control actuator 43 receive control signals according to a target vehicle speed from the controller 30. Based on the input control signal, the accelerator opening actuator 42 controls the driving device and controls the accelerator opening degree of the subject vehicle. Further, based on the input control signal, the brake control actuator 43 controls the braking device so as to control the braking of the subject vehicle. The speed of the subject vehicle can be autonomously controlled when the accelerator opening actuator 42 performs accelerator control of the subject vehicle and the brake control actuator 43 performs brake control of the subject vehicle.

On the other hand, in a manual driving mode, the steering actuator 41 receives a control signal corresponding to the steering angle detected by the vehicle sensor group 20, for example, from the controller 30. The accelerator opening actuator 42 receives a control signal corresponding to the accelerator opening degree detected by the vehicle sensor group 20 from, for example, the controller 30. The brake control actuator 43 receives a control signal according to the amount of brake operation detected by the vehicle sensor group 20 from, for example, the controller 30. Appropriate control already known at the time of filing the present application can be used to implement the control of each actuator in the manual driving mode.

The controller 30 is a processing circuit such as an electronic control unit (ECU) that controls the driving of the subject vehicle. Further, the controller 30 is a processing circuit such as an electronic control unit (ECU) that controls the display for presenting the ambient environment (state of surroundings) to occupants of the subject vehicle. The controller 30 includes a processor 32 and peripheral components such as a storage device 33. For example, the processor 32 may be a central processing unit (CPU) or a micro-processing unit (MPU). The storage device 33 may include any one of a semiconductor storage device, a magnetic storage device, and an optical storage device. The storage device 33 may include memories such as a register, a cache memory, a read only memory (ROM) serving as a main storage device, and a random access memory (RAM). The controller 30 may be implemented by a functional logic circuit that is set in a general-purpose semiconductor integrated circuit. For example, the controller 30 may include a programmable logic device (PLD) such as a field programmable gate array (FPGA).

Functions that can be implemented by the controller 30 will be described. The controller 30 can switch between the automatic driving mode for causing the subject vehicle to travel by autonomous traveling control and the manual driving mode for causing the subject vehicle to travel by driver's manual driving. The switching between the automatic driving mode and the manual driving mode is, for example, performed via an interface that can be operated by an occupant. Further, the controller 30 may be configured in such a way as to notify occupants of switching to the manual driving mode by voice or warning light, when the autonomous traveling of the subject vehicle is determined to be difficult with reference to the information on the ambient environment detected by the ambient environment sensor group 10. The controller 30 is programmed so as to comply with traffic rules when causing the subject vehicle to travel by autonomous traveling control.

In the automatic driving mode, the controller 30 calculates a travel route for causing the subject vehicle to travel, and drives the vehicle control actuator group 40 so that the subject vehicle travels along the travel route. That is, the controller 30 calculates a control amount of the vehicle control actuator group 40 based on the generated travel route, and outputs a control signal corresponding to the calculated control amount to the vehicle control actuator group 40. The controller 30 performs, at predetermined time intervals, the calculation of the control amount and the output of the control signal to the vehicle control actuator group 40, thereby implementing autonomous control of the steering and speed of the subject vehicle.

Further, based on the information on the ambient environment detected by the ambient environment sensor group 10, the controller 30 generates a display image (human machine interface (HMI) image) for presenting the ambient environment (state of surroundings) of the subject vehicle to viewers of the display device 31.

Figure 3:
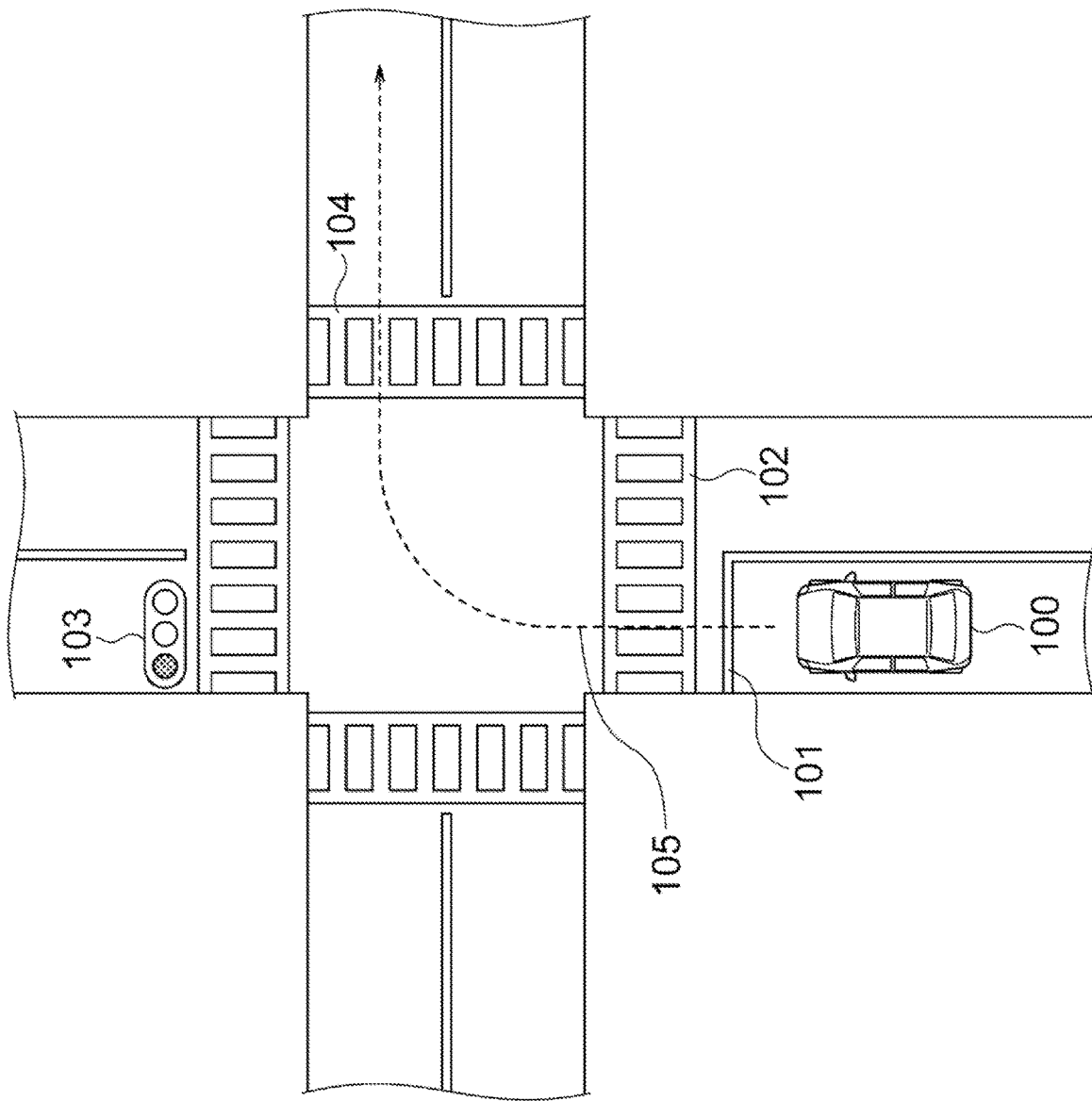
FIG. 3 is a schematic diagram illustrating a scene in which a subject vehicle approaches an intersection.

FIG. 3 illustrates an exemplary scene in which a subject vehicle 100 is traveling along a travel route 105 by autonomous traveling. As illustrated in the example of FIG. 3, the scene in which the subject vehicle 100 enters an intersection from a front side of the intersection and then turns right at the intersection is considered. A stop line 101 and a pedestrian crossing 102 are present on the front side of the intersection. A traffic light 103 is installed on a back side of the intersection. Further, a pedestrian crossing 104 is present at a forward side to which the subject vehicle 100 reaches after turning right.

Figure 4A:
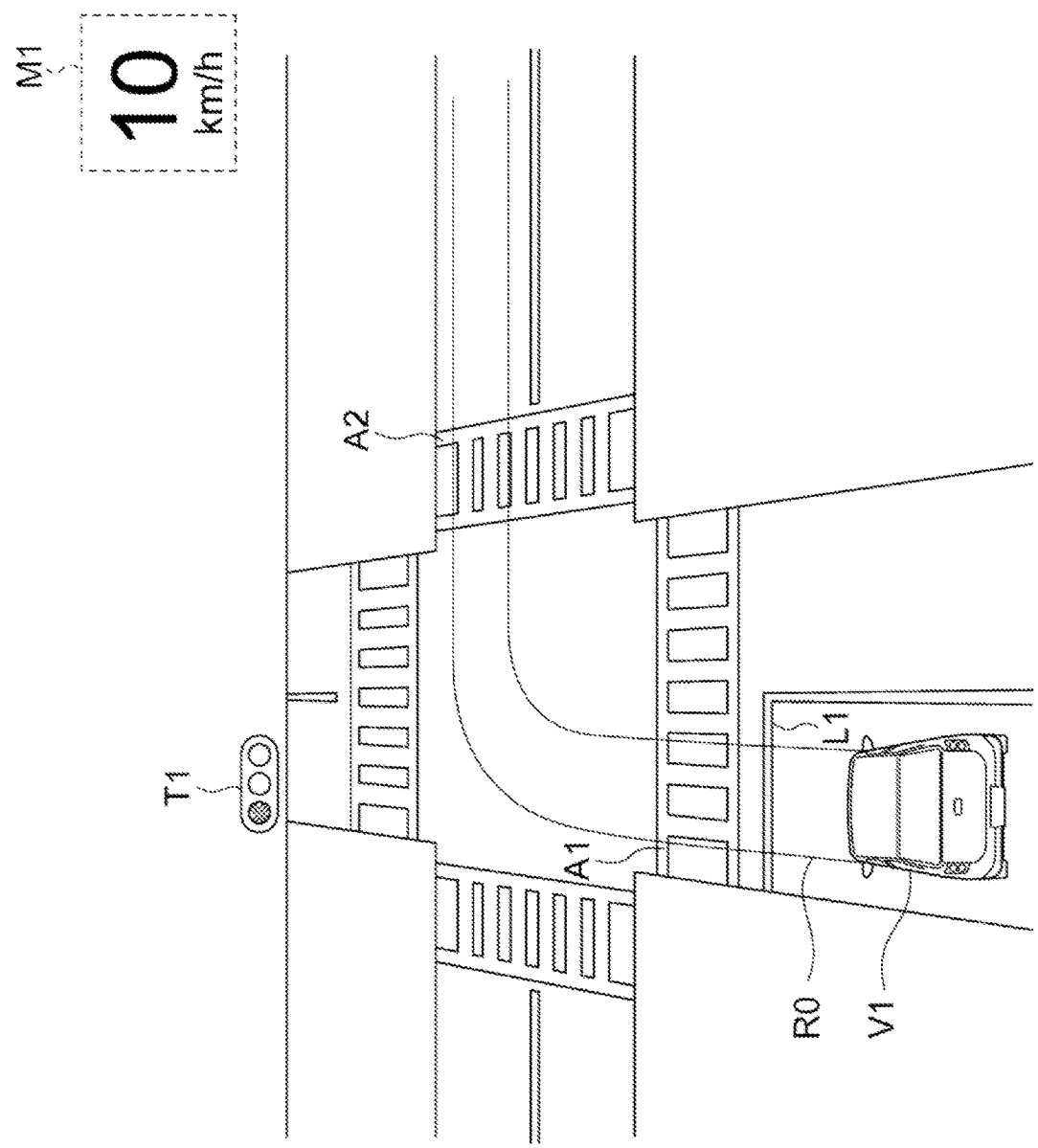
FIG. 4A illustrates an exemplary display image according to the present embodiment.

The controller 30 generates a display image for displaying the state of surroundings of the subject vehicle 100 illustrated in FIG. 3 to the occupants. For example, as illustrated in FIG. 4A, the display image includes display of a road surface ahead of the subject vehicle 100, which includes traveling lanes of the subject vehicle 100 and the intersections illustrated in FIG. 3. The display image may be a bird's-eye view image with a virtual viewpoint positioned diagonally above and behind the subject vehicle 100, for viewing the surroundings of the subject vehicle 100 including a forward area of the subject vehicle 100 extending from the viewpoint position. The display image may be a virtual image such as a computer graphics (CG) image, or may be a captured image captured by the camera 14. FIG. 4A illustrates an exemplary display image according to the present embodiment.

As illustrated in FIG. 4A, the display image includes display of "subject vehicle icon" V1 simulating the subject vehicle 100 of FIG. 3, display of "pedestrian crossing icon" A1 simulating the pedestrian crossing 102 of FIG. 3, display of "traffic light icon" T1 simulating the traffic light 103 of FIG. 3, display of "pedestrian crossing icon" A2 simulating the pedestrian crossing 104 of FIG. 3, and present vehicle speed display M1 of the subject vehicle 100. The display image further includes display of "travel route image" R0 simulating the travel route 105 of the subject vehicle 100 illustrated in FIG. 3. The travel route image R0 is an image having a width comparable to the vehicle width of the subject vehicle V1, and the shape of the travel route image R0 corresponds to the travel route 105 illustrated in FIG. 3. The travel route image R0 may be an image superimposed with a specific color so that it can be distinguished from other displayed portions. Further, although not illustrated in the drawings, when there is any object that may affect the traveling of the subject vehicle, in a forward area of the subject vehicle 100 illustrated in FIG. 3, the display image may include display of "object icon" simulating the object for indicating the position of the object. Examples of the object include preceding vehicles, oncoming vehicles, parked vehicles, motorcycles, bicycles, and pedestrians. For example, icons simulating these objects are stored in the storage device 33.

The controller 30 illustrated in FIG. 1 causes the display device 31 to display the generated display image. Further, based on the information on the ambient environment detected by the ambient environment sensor group 10 and the high-precision map information stored in the high-precision map storage unit 12, the controller 30 performs safety check required for the subject vehicle to travel along the travel route by autonomous traveling. Then, the controller 30 causes the display device 31 to display a display image including a travel route image that distinguishes the range for which the safety check has been completed and other ranges on the travel route of the subject vehicle, although a safety check completed travel route image will be described below.

The display device 31 may be, for example, a display device of a navigation device mounted on the subject vehicle, or may be a display device arranged on a meter panel of the subject vehicle, or a head-up display (HUD) device.

Figure 2:
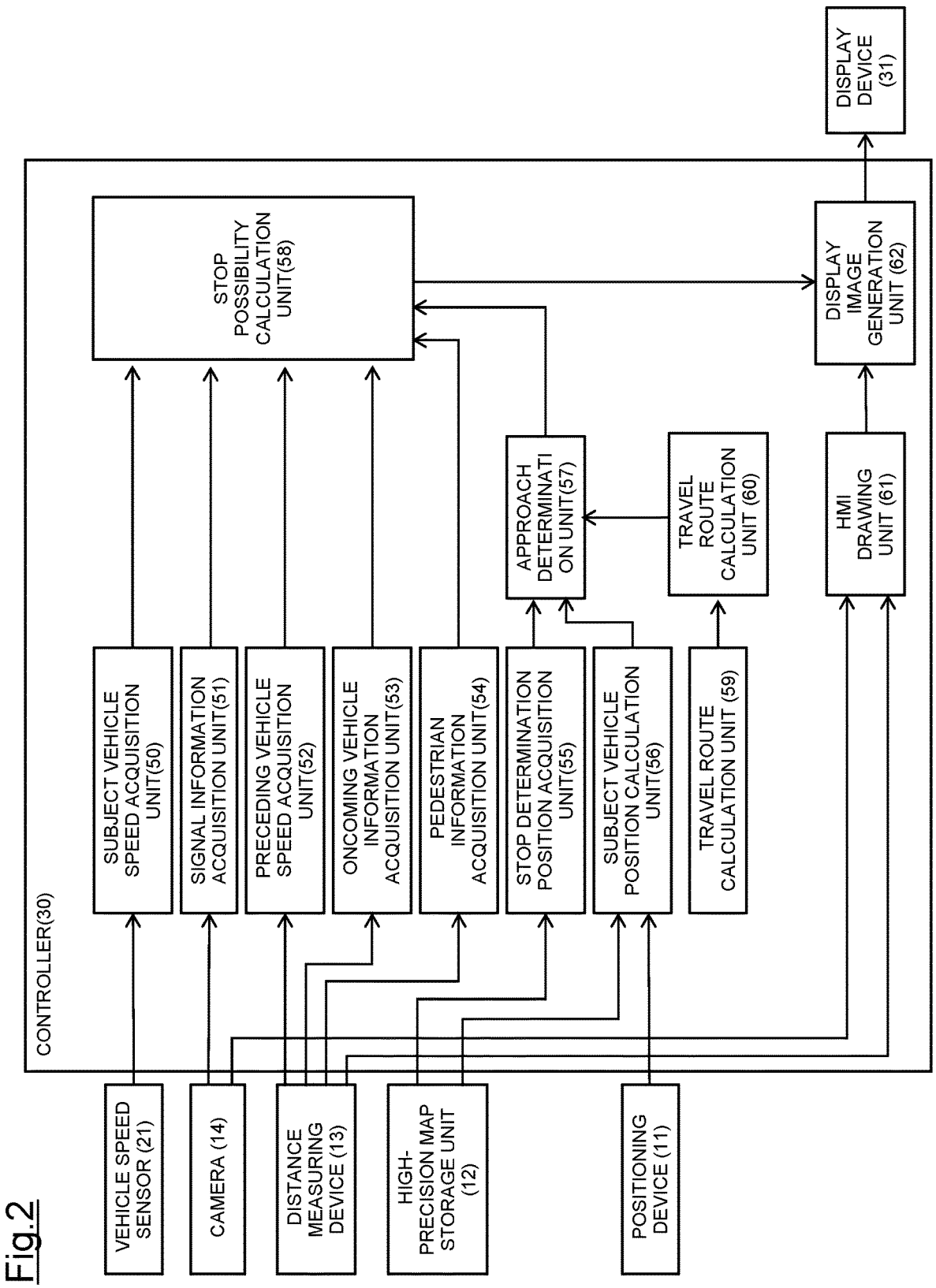
FIG. 2 is a block diagram illustrating an exemplary controller or the like according to the present embodiment.

FIG. 2 is a block diagram illustrating an exemplary controller or the like according to the present embodiment. The controller 30 includes, as illustrated in FIG. 2, a subject vehicle speed acquisition unit 50, a signal information acquisition unit 51, a preceding vehicle speed acquisition unit 52, an oncoming vehicle information acquisition unit 53, a pedestrian information acquisition unit 54, a stop determination position acquisition unit 55, a subject vehicle position calculation unit 56, an approach determination unit 57, a stop possibility calculation unit 58, a travel route calculation unit 59, a travel route acquisition unit 60, an HMI drawing unit 61, and a display image generation unit 62. The function of each block illustrated in FIG. 2 may be implemented by the processor 32 of the controller 30 that executes a computer program stored in the storage device 33.

The subject vehicle speed acquisition unit 50 acquires the vehicle speed of the subject vehicle detected by the vehicle speed sensor 21. The signal information acquisition unit 51 acquires signal information including lighting color and lighting time of a traffic light ahead of the subject vehicle detected by the camera 14. The signal information acquisition unit 51 may acquire the signal information, via the communicator 15 through road-to-vehicle communication, from a traffic light, a roadside machine, or the like, ahead of the subject vehicle.

The preceding vehicle speed acquisition unit 52 acquires preceding vehicle information including presence or absence of a preceding vehicle detected by the distance measuring device 13, relative position of the preceding vehicle with respect to the subject vehicle, and relative distance and relative speed between the subject vehicle and the preceding vehicle. The preceding vehicle speed acquisition unit 52 may perform image processing on a plurality of captured images continuously captured by the camera 14 and may calculate, from image processing results, each piece of information included in the preceding vehicle information. Further, the preceding vehicle speed acquisition unit 52 may acquire the preceding vehicle information from the preceding vehicle, via the communicator 15, through vehicle-to-vehicle communication.

The oncoming vehicle information acquisition unit 53 acquires oncoming vehicle information including presence or absence of an oncoming vehicle detected by the distance measuring device 13, relative position of the oncoming vehicle with respect to the subject vehicle, and relative distance and relative speed between the subject vehicle and the oncoming vehicle. Similar to the preceding vehicle speed acquisition unit 52, the oncoming vehicle information acquisition unit 53 may calculate each piece of information included in the oncoming vehicle information based on a plurality of captured images continuously captured by the camera 14. Further, the oncoming vehicle information acquisition unit 53 may acquire the oncoming vehicle information, via the communicator 15, through vehicle-to-vehicle communication.

The pedestrian information acquisition unit 54 acquires pedestrian information including presence or absence of a pedestrian detected by the distance measuring device 13, relative position of the pedestrian with respect to the subject vehicle, and relative distance and relative speed between the subject vehicle and the pedestrian. Similar to the preceding vehicle speed acquisition unit 52 and the oncoming vehicle information acquisition unit 53, the pedestrian information acquisition unit 54 may calculate each piece of information included in the pedestrian information based on a plurality of captured images continuously captured by the camera 14.

The stop determination position acquisition unit 55 acquires a stop determination position existing on the travel route of the subject vehicle, from the high-precision map information stored in the high-precision map storage unit 12. The stop determination position is a position at which safety check may be performed while the vehicle is stopped. The stop determination position includes positions where the vehicle must stop and positions where the possibility of the vehicle stopping may change depending on peripheral state of the vehicle. The stop determination position includes at least any one of intersections, pedestrian crossings, junctions, traffic lights, and stop lines. When taking an intersection with a traffic light as an example, the stop determination position of the vehicle and the possibility of the vehicle stopping at the stop determination position are variable, at such an intersection, depending on lighting color of the traffic light, course of the subject vehicle, presence or absence of any pedestrian, presence or absence of any oncoming vehicle or the like.

In the example of FIG. 3, when the lighting color of the traffic light 103 is red, it is necessary for the subject vehicle 100 to stop before reaching the stop line 101. On the other hand, when the lighting color of the traffic light 103 is blue, the subject vehicle 100 can enter the intersection without stopping at the stop line 101. Further, it is necessary for the subject vehicle 100 to stop in the intersection depending on presence or absence of any oncoming vehicle. For example, when there is an oncoming vehicle going straight, the straight going of the oncoming vehicle is prioritized over the right turning of the subject vehicle 100, and therefore it is necessary for the subject vehicle 100 to stop in the intersection. On the other hand, for example, when there is no oncoming vehicle, the subject vehicle 100 can turn right without stopping in the intersection. In addition, it is necessary for the subject vehicle 100 to stop before reaching the pedestrian crossing 104 depending on presence or absence of any pedestrian crossing the pedestrian crossing 104. For example, when there is a pedestrian crossing the pedestrian crossing 104, the pedestrian is prioritized over the right turning of the subject vehicle 100, and therefore it is necessary for the subject vehicle 100 to stop before reaching the pedestrian crossing 104. On the other hand, for example, in a case where there is no pedestrian crossing the pedestrian crossing 104, the subject vehicle 100 can pass through the pedestrian crossing 104 without stopping before reaching the pedestrian crossing 104.

In the display control device and the display control method according to the present embodiment, causing the display device 31 to display travel route images in which the above-described complicated and diverse states are shown makes it possible to visually and intuitively let viewers know information such as the possibility of the subject vehicle stopping and the stop positions of the subject vehicle. In addition, the capability of displaying travel route images corresponding to various states makes it possible to increase the number of locations and peripheral environments where viewers can know the state of safety check during autonomous traveling adequately.

The stop determination position acquisition unit 55 acquires, for example, at the timing when the travel route of the subject vehicle is input from the travel route acquisition unit 60, a stop determination position existing on the travel route from the high-precision map information. In this case, as understood from intersections, the stop determination position may exist together with neighboring stop determination positions such as a pedestrian crossing and a traffic light. In such cases, the stop determination position acquisition unit 55 may acquire each stop determination position from the high-precision map information. In the case of the example illustrated in FIG. 3, the stop determination position acquisition unit 55 may acquire, from the high-precision map information, position (position coordinates) of each of the stop line 101, the pedestrian crossing 102, the traffic light 103, and the pedestrian crossing 104, in addition to the reference point of the intersection (traffic lane node information).

The subject vehicle position calculation unit 56 detects the present position of the subject vehicle on the high-precision map based on the positioning information obtained by the positioning device 11 and the high-precision map information stored in the high-precision map storage unit 12.

The approach determination unit 57 determines whether the subject vehicle is approaching the stop determination position based on the stop determination position acquired by the stop determination position acquisition unit 55, the present position of the subject vehicle detected by the subject vehicle position calculation unit 56, and the travel route of the subject vehicle input from the travel route acquisition unit 60. In the case of the example illustrated in FIG. 3, the approach determination unit 57 determines whether the subject vehicle 100 is approaching the intersection. In the example of FIG. 3, since the relative distance between the subject vehicle 100 and the stop line 101 is the shortest, the approach determination unit 57 may determine whether the subject vehicle 100 is approaching the stop line 101.

The approach determination unit 57 calculates the distance between the stop determination position and the present position of the subject vehicle, and when the calculated distance is less than a predetermined threshold, determines that the subject vehicle is approaching the stop determination position. On the other hand, when the distance between the stop determination position and the present position of the subject vehicle is equal to or longer than the predetermined threshold, the approach determination unit 57 determines that the subject vehicle is not approaching the stop determination position. The predetermined threshold is a distance that ensures the subject vehicle to stop before reaching the stop determination position after starting deceleration. For example, the predetermined threshold is set in consideration of the distance between the present position of the subject vehicle and the stop determination position and a distance corresponding to the speed of the subject vehicle. Setting such a threshold makes it possible to eliminate the possibility of the subject vehicle decelerating rapidly, even when the subject vehicle needs to stop at the stop determination position, and reduce the sense of discomfort felt by occupants during autonomous traveling.

The travel route calculation unit 59 calculates the travel route of the subject vehicle on the high-precision map stored in the high-precision map storage unit 12 based on the present position of the subject vehicle calculated by the subject vehicle position calculation unit 56 and a destination that can be set by an occupant' operation or the like. The travel route calculation unit 59 calculates a traffic lane-level travel route, as a route extending from the present position of the subject vehicle to the destination. In the automatic driving mode, the steering and speed of the subject vehicle are controlled so that the subject vehicle travels along the travel route calculated by the travel route calculation unit 59.

The travel route acquisition unit 60 acquires the travel route calculated by the travel route calculation unit 59. The travel route of the subject vehicle acquired by the travel route acquisition unit 60 is used not only for autonomous traveling of the subject vehicle in the automatic driving mode but also for approach determination by the approach determination unit 57 and generation of the HMI image in the HMI drawing unit 61.

When the approach determination unit 57 determines that the subject vehicle is approaching the stop determination position, the stop possibility calculation unit 58 performs, based on the information on the ambient environment detected by the ambient environment sensor group 10, safety check required for the subject vehicle to autonomously travel along the travel route. The stop possibility calculation unit 58 determines, as one of safety checks, whether to stop the subject vehicle at the stop determination position. When it is determined that stopping the subject vehicle at the stop determination position is unnecessary, that is, when it is determined that the subject vehicle can pass through the stop determination position, the stop possibility calculation unit 58 determines that the safety check has been completed with respect to the subject vehicle passing through the stop determination position. On the other hand, when it is determined that stopping the subject vehicle at the stop determination position is necessary, that is, when it is determined that the subject vehicle cannot pass through the stop determination position, the stop possibility calculation unit 58 determines that the safety check is not completed yet with respect to the subject vehicle passing through the stop determination position.

Factors that cause the subject vehicle to stop (hereinafter, also simply referred to as stopping factors) include on-road structures such as stop signs and non-advanceable display by traffic lights and moving objects crossing the travel route of the subject vehicle. In the present embodiment, described as exemplary stopping factors are traffic lights (serving as exemplary on-road structures) and also pedestrians and oncoming vehicles (both serving as exemplary moving objects crossing the travel route). The stopping factors are also referred to as factors that prevent the subject vehicle from traveling by autonomous traveling along the travel route, that is, factors that hinder the advancement of the subject vehicle by autonomous traveling.

When performing safety check for multiple stopping factors existing around the subject vehicle, the stop possibility calculation unit 58 performs stopping factor safety check for each stopping factor. In the example of FIG. 3, the traffic light 103, an oncoming vehicle (not illustrated) going straight through the intersection, and a pedestrian crossing the pedestrian crossing 104 are exemplary stopping factors that cause the subject vehicle 100 to stop. Exemplary safety check for each stopping factor will be described below.

The stop possibility calculation unit 58 performs safety check for the traffic light based on the signal information acquired by the signal information acquisition unit 51, performs safety check for the pedestrian based on the pedestrian information acquired by the pedestrian information acquisition unit 54, and performs safety check for the oncoming vehicle based on the oncoming vehicle information acquired by the oncoming vehicle information acquisition unit 53.

For example, as the safety check for the traffic light, the stop possibility calculation unit 58 determines the necessity of causing the subject vehicle to stop at the stop line according to the lighting color of the traffic light at the timing when the approach determination unit 57 determines that the subject vehicle is approaching the intersection. When the lighting color of the traffic light indicates being non-advanceable (when the lighting color of the traffic light is red), the stop possibility calculation unit 58 determines that stopping the subject vehicle at the stop line is necessary.

On the other hand, when the lighting color of the traffic light indicates being advanceable for a predetermined time (when the lighting color of the traffic light is blue), the stop possibility calculation unit 58 determines that stopping the subject vehicle at the stop line is unnecessary. Further, when the display of the traffic light indicates transition from being advanceable to being non-advanceable (when the lighting color of the traffic light is yellow), the stop possibility calculation unit 58 determines that stopping the subject vehicle at the stop line is necessary.

Further, as the safety check for the pedestrian, the stop possibility calculation unit 58 determines the necessity of causing the subject vehicle to stop before reaching the pedestrian crossing based on the pedestrian information at the timing when the approach determination unit 57 determines that the subject vehicle is approaching the pedestrian crossing. For example, the stop possibility calculation unit 58 calculates the time to collision (TTC) until the subject vehicle collides with the pedestrian, with reference to the relative distance between the subject vehicle and the pedestrian, moving direction of the pedestrian, vehicle speed of the subject vehicle, and moving speed of the pedestrian determined in advance. When the calculated time to collision is less than a predetermined threshold, the stop possibility calculation unit 58 determines that stopping the subject vehicle before reaching the pedestrian crossing is necessary. When the calculated time to collision is equal to or longer than the predetermined threshold, the stop possibility calculation unit 58 determines that stopping the subject vehicle before reaching the pedestrian crossing is unnecessary.

Further, as the safety check for the oncoming vehicle, the stop possibility calculation unit 58 determines the necessity of causing the subject vehicle to stop at a predetermined position in the intersection based on the oncoming vehicle information at the timing when the approach determination unit 57 determines that the subject vehicle is approaching the stop determination position. For example, the stop possibility calculation unit 58 calculates the time to collision (TTC) until the subject vehicle collides with the oncoming vehicle, with reference to the relative distance and relative speed between the subject vehicle and the oncoming vehicle. When the calculated time to collision is less than a predetermined threshold, the stop possibility calculation unit 58 determines that stopping the subject vehicle at a predetermined position in the intersection is necessary. When the calculated time to collision is equal to or longer than the predetermined threshold, the stop possibility calculation unit 58 determines that stopping the subject vehicle at a predetermined position in the intersection is unnecessary. The predetermined threshold to be compared with the time to collision may be different from the threshold used in the safety check for the pedestrian and the threshold used in the safety check for the oncoming vehicle. Further, the predetermined position in the intersection is a position set based on an imaginary traveling path boundary included in the high-precision map information and is set at a position where the subject vehicle does not hinder the traveling of the oncoming vehicle (e.g., near the center of the intersection).

Further, in the present embodiment, when there are multiple stopping factors that cause the subject vehicle to stop at a predetermined stop determination position, the stop possibility calculation unit 58 performs safety check for each stopping factor and determines the necessity of stopping the subject vehicle at the stop determination position. Further, in the present embodiment, when it is determined that stopping the subject vehicle at the stop determination position is necessary, the stop possibility calculation unit 58 performs safety check for an object range extending from the present position of the subject vehicle to the stop determination position. For example, the stop possibility calculation unit 58 determines the presence or absence of any object that may cross the range extending from the present position of the subject vehicle to the stop determination position, of the travel route.

Here, the relationship between the stop possibility calculation unit 58 and the autonomous traveling control of the subject vehicle (autonomous speed control) will be described. When the stop possibility calculation unit 58 determines that stopping the subject vehicle at the stop determination position is necessary, the controller 30 calculates a control amount of the brake control actuator 43 to cause the subject vehicle to stop at the stop determination position. The controller 30 outputs a control signal corresponding to the calculated control amount to the brake control actuator 43. As a result, the subject vehicle can autonomously stop at the stop determination position. In a case where a preceding vehicle also stops at the stop determination position, the controller 30 sets a stop position closer than the stop determination position based on the relative distance between the subject vehicle and the preceding vehicle, and calculates a control amount of the brake control actuator 43 to cause the subject vehicle to stop at the set stop position.

The HMI drawing unit 61 draws (generates) a display image (base image) for displaying the state of surroundings of the subject vehicle including the state ahead of the subject vehicle, based on the state of surroundings of the subject vehicle detected by the camera 14 and the distance measuring device 13. The display image illustrated in FIG. 4A is an example of the display image. The HMI drawing unit 61 sequentially updates the display image according to the movement of the subject vehicle. In the example of FIG. 3, when the subject vehicle moves along the travel route 105, the HMI drawing unit 61 updates the base image displaying the state of surroundings of the subject vehicle according to the movement of the subject vehicle.

The display image generation unit 62 generates, based on determination results of the approach determination unit 57 and determination results of the stop possibility calculation unit 58, a travel route image including a range being completed in safety check required for the subject vehicle to travel by autonomous traveling along the travel route and other ranges that are distinguished on the travel route.

When the approach determination unit 57 determines that the subject vehicle is approaching the stop determination position, the display image generation unit 62 sets, as an advanceable range, a range extending from the present position of the subject vehicle to the stop determination position, and also sets, as a non-advanceable range, a range following the stop determination position, in the travel route of the subject vehicle. The display image generation unit 62 generates, as the travel route image in which the advanceable range and the non-advanceable range are distinguished, a travel route image in which the advanceable range and the non-advanceable range are differentiated in at least any one of color, pattern, and brightness.

Figure 4B:
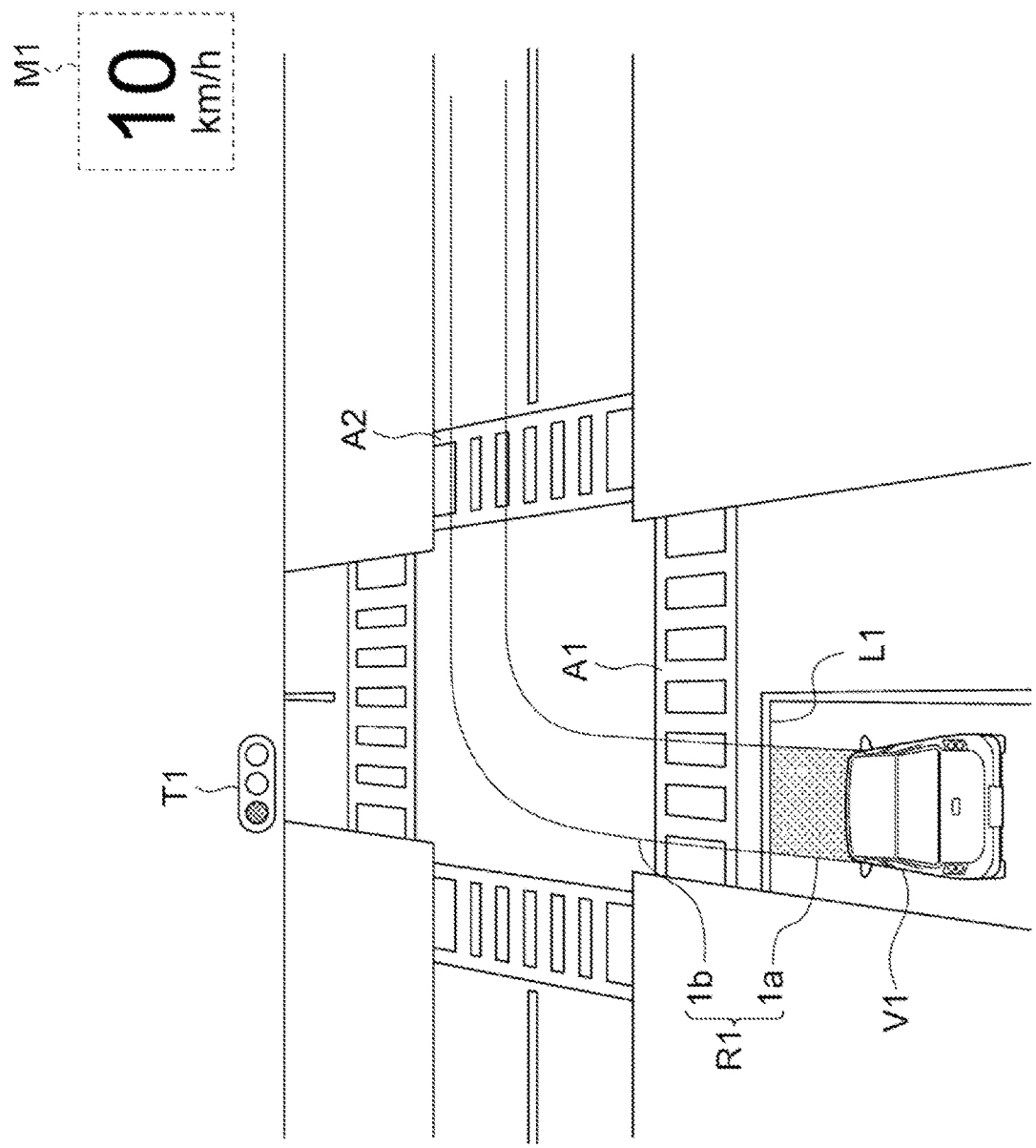
FIG. 4B illustrates an exemplary display image according to the present embodiment.

For example, referring to FIG. 3, a scene in which the subject vehicle 100 is traveling in front of the stop line 101 is considered. When the approach determination unit 57 determines that the subject vehicle 100 is approaching the intersection (the stop line 101), the display image generation unit 62 generates, for example, as illustrated in FIG. 4B, a travel route image R1 in which an advanceable range 1*a* extending from the subject vehicle icon V1 to a stop line icon L1 and a non-advanceable range 1b are distinguished. The display image generation unit 62 generates the travel route image R1 so as to differentiate the advanceable range 1a and the non-advanceable range 1b from each other in color, for example, in such a way as to emphasize the advanceable range 1a than the non-advanceable range 1b. The display image generation unit 62 causes the display device 31 to display a display image including the travel route image R1. FIG. 4B illustrates an exemplary image to be displayed when the subject vehicle 100 is traveling in front of the stop line 101 in the scene of FIG. 3.

Further, when the stop possibility calculation unit 58 completes the safety check for the stopping factor, the display image generation unit 62 generates a travel route image in which the boundary between the advanceable range and the non-advanceable range is moved in a direction along which the subject vehicle advances, compared to the travel route image preceding the safety check. Each time the safety check in the advancing direction of the subject vehicle completes, the display image generation unit 62 generates a travel route image in which the advanceable range is extended in the advancing direction of the subject vehicle, and causes the display device 31 to display the travel route image. As a result, since the advanceable range in the travel route image is extended each time the determination result indicating the completion of the safety check is obtained, it is easy for viewers of the display image to intuitively grasp that the autonomously traveling subject vehicle will travel in the advanceable range along the travel route. In the present embodiment, when the stop possibility calculation unit 58 completes the safety check for the stopping factor, the display image generation unit 62 sets, as an advanceable range, a range to a next stop determination position through which the subject vehicle is scheduled to pass (next stop determination position). When the stop possibility calculation unit 58 completes the safety check for the stopping factor, the display image generation unit 62 may set, as an advanceable range, a range to a point closer than the next stop determination position.

On the other hand, until the stop possibility calculation unit 58 completes the safety check for the stopping factor, the display image generation unit 62 generates a travel route image in which the boundary between the advanceable range and the non-advanceable range does not change from the travel route image preceding the safety check, and causes the display device 31 to display the travel route image. As a result, since the advanceable range in the travel route image is held until the determination result indicating the completion of the safety check is obtained, it is easy for viewers of the display image to intuitively grasp that the autonomously traveling subject vehicle will stop at the boundary between the advanceable range and the non-advanceable range.

Figure 4C:
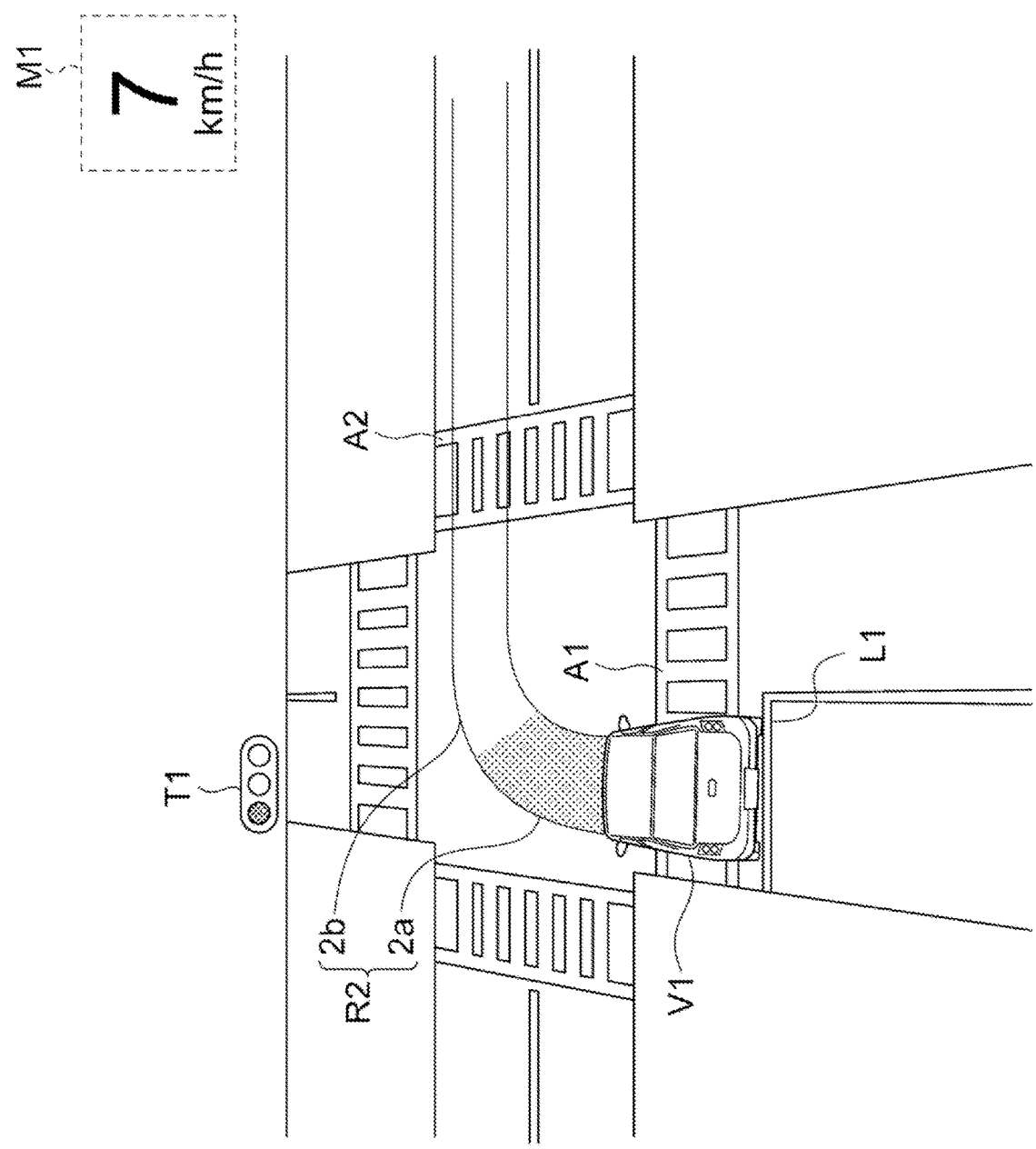
FIG. 4C illustrates an exemplary display image according to the present embodiment.

For example, referring to FIG. 3, a scene in which the subject vehicle is traveling on the pedestrian crossing 102 is considered. When the stop possibility calculation unit 58 determines that stopping the subject vehicle 100 at the stop line 101 is unnecessary, and when the safety check for the traffic light 103 has been completed, the display image generation unit 62 generates a travel route image R2 in which an advanceable range 2a extending from the subject vehicle icon V1 to a predetermined position in the intersection and a non-advanceable range 2b are distinguished, for example, as illustrated in FIG. 4C. The display image generation unit 62 generates the travel route image R2 so as to differentiate the advanceable range 2a and the other non-advanceable range 2b from each other in color, for example, in such a way as to emphasize the advanceable range 2a than the non-advanceable range 2b. The display image generation unit 62 causes the display device 31 to display a display image including the travel route image R2. FIG. 4C illustrates an exemplary image to be displayed when the subject vehicle 100 is traveling on the pedestrian crossing 102 in the scene of FIG. 3.

Figure 4D:
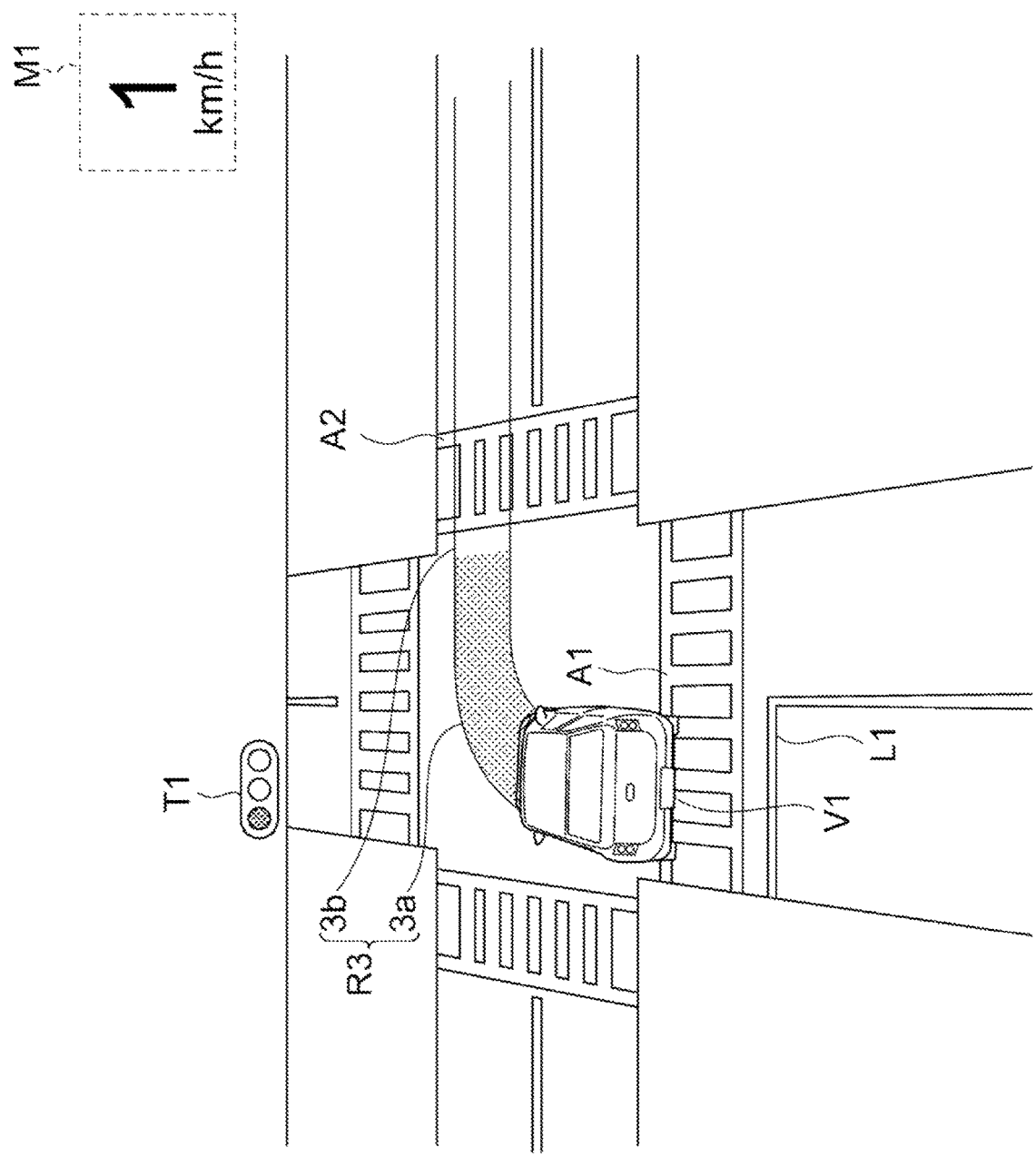
FIG. 4D illustrates an exemplary display image according to the present embodiment.

Further, for example, referring to FIG. 3, a scene in which the subject vehicle is traveling in front of the center of the intersection is considered. When the stop possibility calculation unit 58 determines that stopping the subject vehicle 100 at the center of the intersection is unnecessary, and when the safety check for the oncoming vehicle has been completed, the display image generation unit 62 generates a travel route image R3 in which an advanceable range 3a extending from the subject vehicle icon V1 to a point closer to the pedestrian crossing icon A2 and a non-advanceable range 3b other than the advanceable range 3a are distinguished, for example, as illustrated in FIG. 4D. The display image generation unit 62 generates the travel route image R3 so as to differentiate the advanceable range 3a and the non-advanceable range 3b from each other in color, for example, in such a way as to emphasize the advanceable range 3a than the non-advanceable range 3b. The display image generation unit 62 causes the display device 31 to display a display image including the travel route image R3. FIG. 4D illustrates an exemplary image to be displayed when the subject vehicle 100 is traveling in front of the center of the intersection in the scene of FIG. 3.

In the present embodiment, the display image generation unit 62 causes the display device 31 to display the advanceable range that is identical in display form regardless of the type of each stopping factor. In the examples of FIG. 4C and FIG. 4D, the display image generation unit 62 causes the display device 31 to display the advanceable range 2a and the advanceable range 3a, which are the same in color, for example, even when the stopping factor is the oncoming vehicle or the pedestrian crossing the pedestrian crossing 104.

Figure 5:
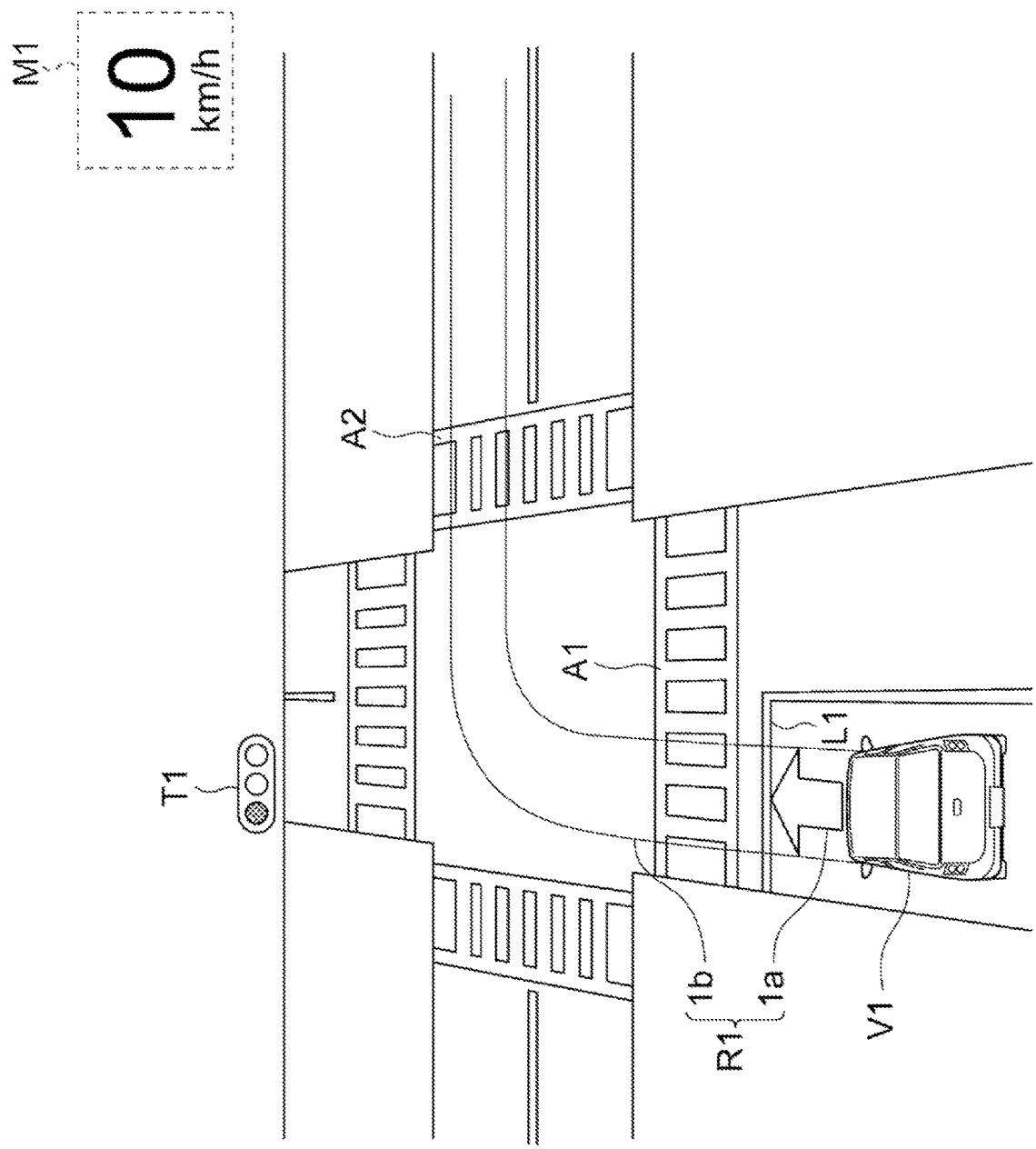
FIG. 5 illustrates another exemplary display image according to the present embodiment.

Further, in the description using FIG. 4B to FIG. 4D, the exemplarily described method is for distinguishing the advanceable range and the non-advanceable range from each other in color. However, the method for distinguishing the advanceable range and the non-advanceable range from each other is not limited to this example. The display image generation unit 62 may generate a display image R1 in which (arrow-shaped icon) display simulating safety check completion display is superimposed on the advanceable range 1a, for example, as illustrated in FIG. 5. The shape of the icon simulating the safety check completion display is not limited particularly, as long as the advanceable range and the non-advanceable range can be distinguished from each other. FIG. 5 illustrates another exemplary display image according to the present embodiment.

Figure 6:
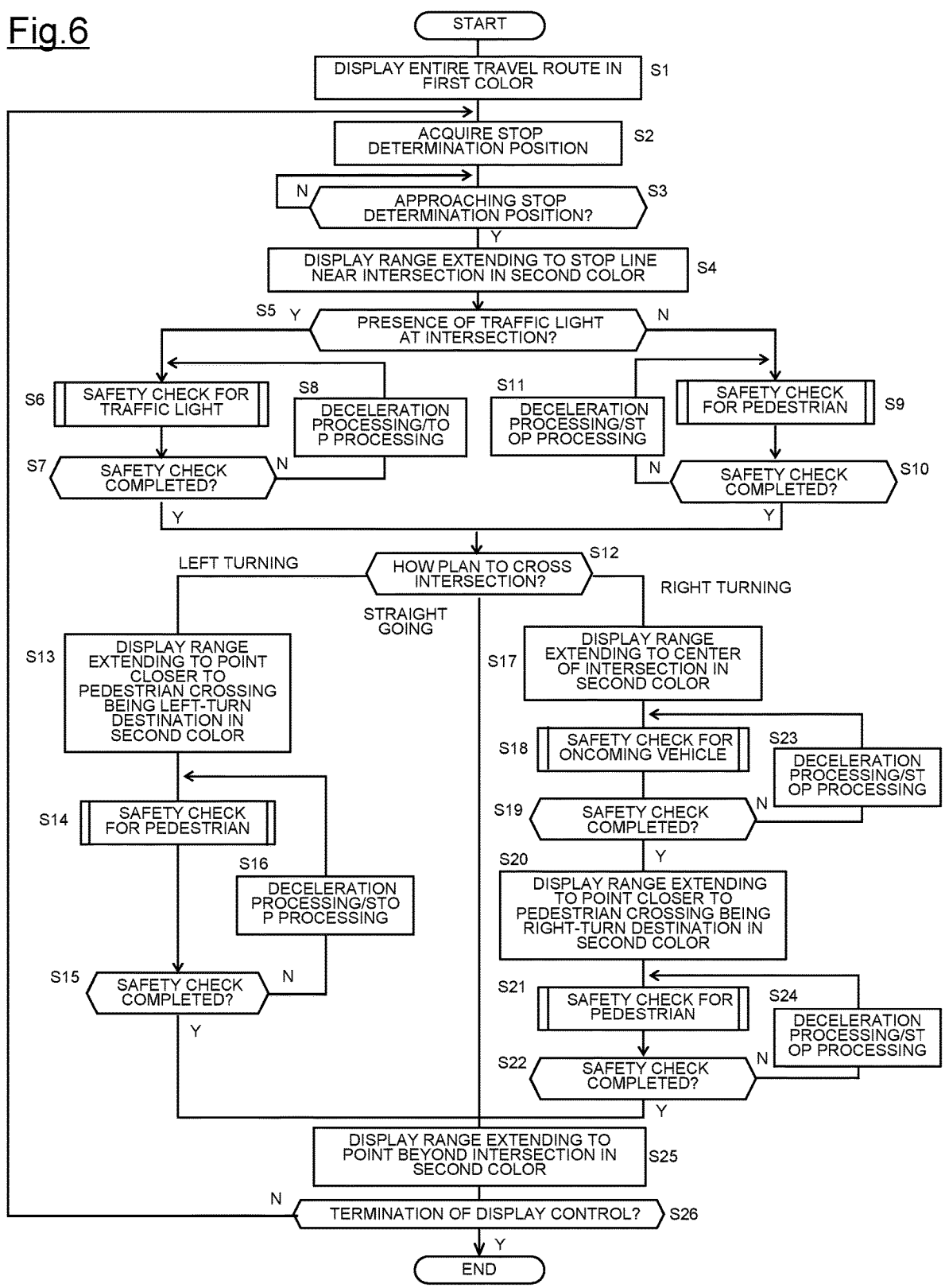
FIG. 6 is an exemplary flowchart illustrating a display control method in a case where the subject vehicle passes through the intersection by autonomous traveling.

Next, an exemplary display control method according to the present embodiment will be described with reference to a flowchart of FIG. 6. The controller 30 of FIG. 1 executes the flowchart illustrated in FIG. 6. Further, the flowchart illustrated in FIG. 6 is an exemplary flowchart in a case where the subject vehicle passes through the intersection by autonomous traveling.

In step S1, the controller 30 calculates the travel route of the subject vehicle on the high-precision map stored in the high-precision map storage unit 12, based on the present position of the subject vehicle and the destination set by the occupant's operation or the like. The controller 30 generates a travel route image in which the calculated entire travel route is superimposed and displayed in a first color, and causes the display device 31 to display a display image including the generated travel route image. Until the flowchart of FIG. 6 starting with this step terminates, the controller 30 executes the following processing at predetermined time intervals. The controller 30 acquires, at predetermined time intervals, the vehicle speed of the subject vehicle from the vehicle speed sensor 21. Further, the controller 30 acquires, at predetermined time intervals, the information on the ambient environment of the subject vehicle from the ambient environment sensor group 10. Further, the controller 30 outputs, to the vehicle control actuator group 40, a control signal for causing the subject vehicle to autonomously travel along the calculated travel route. Further, the controller 30 acquires, at predetermined time intervals, the present position of the subject vehicle from the positioning device 11.

In step S2, the controller 30 acquires the stop determination position from the high-precision map information stored in the high-precision map storage unit 12. For example, the controller 30 acquires an intersection, a pedestrian crossing, a junction, a traffic light, a stop line, or the like, as the stop determination position, from the high-precision map information.

In step S3, the controller 30 determines whether the subject vehicle is approaching the intersection that is the stop determination position acquired in step S2. The controller 30 calculates the distance between the intersection and the present position of the subject vehicle, and when the calculated distance is less than a predetermined threshold, determines that the subject vehicle is approaching the intersection. On the other hand, when the calculated distance is equal to or longer than the predetermined threshold, the controller 30 determines that the subject vehicle is not approaching the intersection. If the determination made by the controller 30 is affirmative, then the processing proceeds to step S4. If the determination made by the controller 30 is negative, then the processing stays at step S3 unless the determination by the controller 30 turns to affirmative.

In step S4, the controller 30 generates a travel route image in which an advanceable range extending from the present position of the subject vehicle to the stop line is superimposed and displayed in a second color. The second color is different from the first color. The controller 30 causes the display device 31 to display a display image including the generated travel route image (refer to FIG. 4B).

In step S5, the controller 30 determines the presence or absence of a traffic light at the intersection based on the information on the ambient environment detected by the ambient environment sensor group 10. For example, when the traffic light is detected from a captured image of the forward area of the subject vehicle captured by the camera 14, the controller 30 determines that the traffic light is present at the intersection. On the other hand, for example, when the presence of any traffic light cannot be detected by either the distance measuring device 13 or the camera 14, the controller 30 determines that no traffic light is present at the intersection. If the determination made by the controller 30 is affirmative, then the processing proceeds to step S6. If the determination made by the controller 30 is negative, then the processing proceeds to step S9.

When the determination made by the controller 30 is affirmative in step S5, the processing proceeds to step S6. In step S6, the controller 30 performs safety check for the traffic light. When the processing proceeds to step S6, the controller 30 executes a subroutine illustrated in FIG. 7A.

Figure 7A:
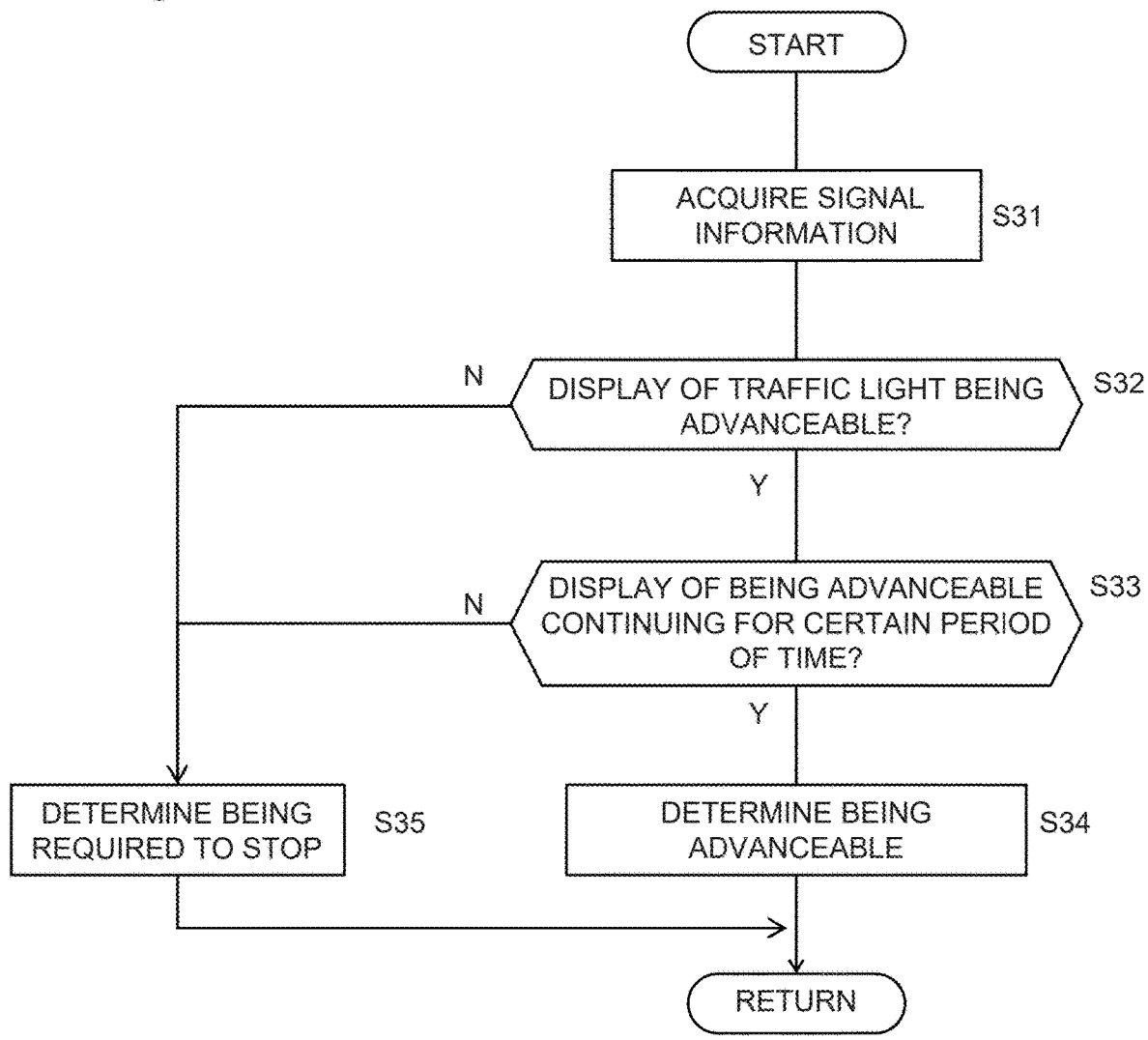
FIG. 7A is an exemplary subroutine illustrating safety check processing for a traffic light.

FIG. 7A is an exemplary subroutine illustrating safety check processing for the traffic light.

In step S31, the controller 30 acquires signal information including lighting color and lighting time of the traffic light ahead of the subject vehicle, detected by the camera 14. In step S32, the controller 30 determines, from the lighting color of the traffic light ahead of the subject vehicle, whether the display of the traffic light indicates being advanceable. For example, the controller 30 determines that the display of the traffic light indicates being advanceable when the lighting color of the traffic light is blue, and determines that the display of the traffic light indicates being non-advanceable when the lighting color of the traffic light is yellow or red. If the determination made by the controller 30 is affirmative, then the processing proceeds to step S33. If the determination made by the controller 30 is negative, then the processing proceeds to step S35.

When the determination made by the controller 30 is affirmative in step S32, the processing proceeds to step S33. In step S33, the controller 30 determines, from the lighting time of the traffic light, whether the traffic light display of being advanceable is continuing for a certain period of time. If the determination made by the controller 30 is affirmative, then the processing proceeds to step S34. If the determination made by the controller 30 is negative, then the processing proceeds to step S35.

When the determination made by the controller 30 is affirmative in step S33, the processing proceeds to step S34. In step S34, the controller 30 confirms that the subject vehicle can advance across the stop line in front of the intersection and determines that the safety check for the traffic light has been completed. On the other hand, when the determination made by the controller 30 is negative in step S32 or step S33, the processing proceeds to step S35. In step S35, the controller 30 confirms that the subject vehicle is required to stop at the stop line in front of the intersection and determines that the safety check for the traffic light is not completed yet. When the processing of step S34 or step S35 terminates, the processing exits the subroutine of FIG. 7A and proceeds to step S7 of FIG. 6.

In step S7 of FIG. 6, the controller 30 confirms the result of the safety check for the traffic light. When the processing proceeds from step S34 to step S7 in FIG. 7A, the controller 30 determines that the safety check for the traffic light has been completed. On the other hand, when the processing proceeds from step S35 to step S7 in FIG. 7A, the controller 30 determines that the safety check for the traffic light is not completed yet. If the determination made by the controller 30 is affirmative, then the processing proceeds to step S12. If the determination made by the controller 30 is negative, then the processing proceeds to step S8.

When the determination made by the controller 30 is negative in step S7, the processing proceeds to step S8. In step S8, the controller 30 executes deceleration processing and stop processing for causing the subject vehicle to stop at the stop line in front of the intersection (the boundary between the first color and the second color in the travel route image). The controller 30 calculates a control amount of the brake control actuator 43 in order to stop at the stop line in front of the intersection. The controller 30 outputs a control signal corresponding to the calculated control amount to the brake control actuator 43. When the processing of step S8 terminates and the subject vehicle stops at the stop line in front of the intersection, the processing returns to step S6. In this case, while the subject vehicle stops at the stop line in front of the intersection, the controller 30 performs safety check for the traffic light again according to the subroutine of FIG. 7A.

Figure 7B:
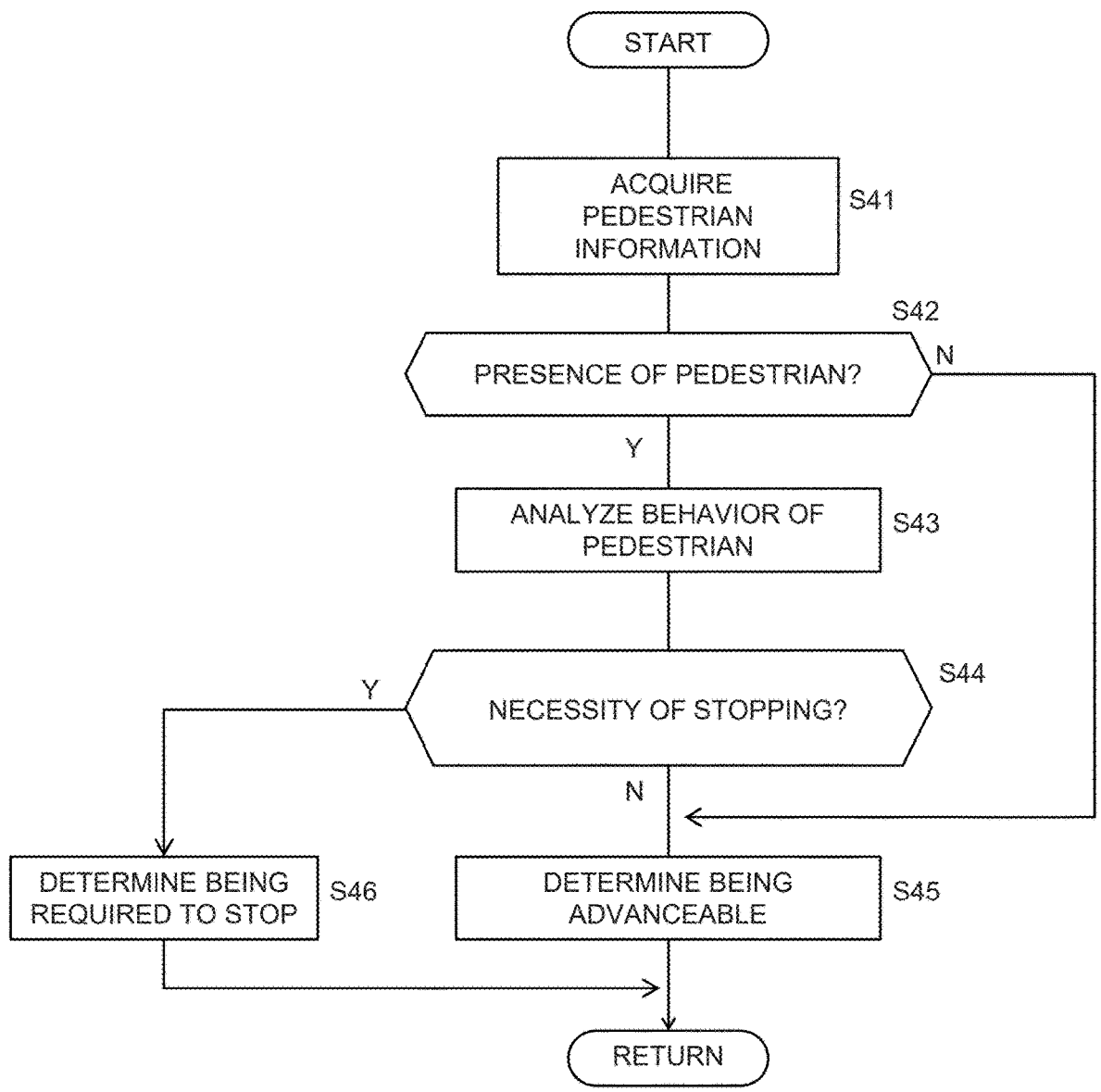
FIG. 7B is an exemplary subroutine illustrating safety check processing for a pedestrian.

When the determination made by the controller 30 is negative in step S5, the processing proceeds to step S9. In step S9, the controller 30 performs safety check for the pedestrian. When the processing proceeds to step S9, the controller 30 executes a subroutine illustrated in FIG. 7B. FIG. 7B is an exemplary subroutine illustrating safety check processing for the pedestrian.

In step S41, the controller 30 acquires the pedestrian information including presence or absence of a pedestrian detected by the distance measuring device 13, relative position of the pedestrian with respect to the subject vehicle, and relative distance and relative speed between the subject vehicle and the pedestrian. In step S42, the controller 30 determines whether a pedestrian is present with reference to the pedestrian information. If the determination made by the controller 30 is affirmative, then the processing proceeds to step S43. If the determination made by the controller 30 is negative, then the processing proceeds to step S45.

When the determination made by the controller 30 is affirmative in step S42, the processing proceeds to step S43. In step S43, the controller 30 analyzes the behavior of the pedestrian based on the pedestrian information. For example, the controller 30 calculates the time to collision until the subject vehicle collides with the pedestrian, with reference to the relative distance between the subject vehicle and the pedestrian, moving direction of the pedestrian, vehicle speed of the subject vehicle, and moving speed of the pedestrian determined in advance.

In step S44, the controller 30 determines, based on the result of step S43, whether stopping the subject vehicle before reaching the pedestrian crossing is necessary. For example, when the time to collision calculated in step S43 is less than a predetermined threshold, the controller 30 determines that stopping the subject vehicle before reaching the pedestrian crossing is necessary. On the other hand, when the time to collision calculated in step S43 is longer than the predetermined threshold, the controller 30 determines that stopping the subject vehicle before reaching the pedestrian crossing is unnecessary. If the determination made by the controller 30 is negative, then the processing proceeds to step S45. If the determination made by the controller 30 is affirmative, then the processing proceeds to step S46.

When the determination made by the controller 30 is negative in step S42 or step S44, the processing proceeds to step S45. In step S45, the controller 30 confirms that the subject vehicle can advance through the pedestrian crossing and determines that the safety check for the pedestrian has been completed. On the other hand, when the determination made by the controller 30 is affirmative in step S44, the processing proceeds to step S46. In step S46, the controller 30 confirms that stopping the subject vehicle before reaching the pedestrian crossing is necessary, and determines that the safety check for the pedestrian is not completed yet. When the processing in step S45 or step S46 terminates, the processing exits the subroutine of FIG. 7B and proceeds to step S10 of FIG. 6.

In step S10 of FIG. 6, the controller 30 confirms the result of the safety check for the pedestrian. When the processing proceeds from step S45 to step S10 in FIG. 7B, the controller 30 determines that the safety check for the pedestrian has been completed. On the other hand, when the processing proceeds from step S46 to step S10 in FIG. 7B, the controller 30 determines that the safety check for the pedestrian is not completed yet. If the determination made by the controller 30 is affirmative, then the processing proceeds to step S12. If the determination made by the controller 30 is negative, then the processing proceeds to step S11.

When the determination made by the controller 30 is negative in step S10, the processing proceeds to step S11. In step S11, the controller 30 executes deceleration processing and stop processing for causing the subject vehicle to stop at the stop line in front of the intersection (the boundary between the first color and the second color in the travel route image). Since step S11 corresponds to step S8, the description of step S8 can be referred to and repetitive description will be omitted. When the processing of step S11 terminates and the subject vehicle stops at the stop line in front of the intersection, the processing returns to step S9. In this case, while the subject vehicle stops at the stop line in front of the intersection, the controller 30 performs safety check for the pedestrian again according to the subroutine of FIG. 7B.

When the determination made by the controller 30 is affirmative in step S7 or step S10, the processing proceeds to step S12. In step S12, the controller 30 determines, based on the travel route of the subject vehicle, whether the subject vehicle will pass through the intersection by any one of "left turning", "straight going", and "right turning".

When it is determined in step S12 that the subject vehicle will pass through the intersection by "left turning", the processing proceeds to step S13. In step S13, the controller 30 generates a travel route image in which an advanceable range extending from the present position of the subject vehicle to a point closer to the pedestrian crossing being a left-turn destination is superimposed and displayed in the second color. The controller 30 causes the display device 31 to display a display image including the generated travel route image.

In step S14, the controller 30 performs safety check for the pedestrian. When the processing proceeds to step S14, which is similar to step S9, the controller 30 executes the subroutine illustrated in FIG. 7B. Since the subroutine of FIG. 7B has already been described, repetitive description will be omitted. When the processing of step S45 or step S46 in FIG. 7B terminates, the processing exits the subroutine of FIG. 7B and proceeds to step S15 of FIG. 6.

In step S15 of FIG. 6, the controller 30 confirms the result of the safety check for the pedestrian. Since step S15 corresponds to step S10, the description of step S10 can be referred to and repetitive description will be omitted. If the determination made by the controller 30 is affirmative, then the processing proceeds to step S25. If the determination made by the controller 30 is negative, then the processing proceeds to step S16.

When the determination made by the controller 30 is negative in step S15, the processing proceeds to step S16. In step S16, the controller 30 executes deceleration processing and stop processing for causing the subject vehicle to stop before reaching the pedestrian crossing being the left-turn destination (the boundary between the first color and the second color in the travel route image). Since the deceleration processing and stop processing by the controller 30 are similar to those in step S8 and step S11, the descriptions of these steps can be referred to and repetitive description will be omitted. When the processing of step S16 terminates and the subject vehicle stops before reaching the pedestrian crossing being the left-turn destination, the processing returns to step S14. In this case, while the subject vehicle has stopped before reaching the pedestrian crossing being the left-turn destination, the controller 30 performs the safety check for the pedestrian again according to the subroutine of FIG. 7B.

If it is determined in step S12 that the subject vehicle will pass through the intersection by "straight going", then the processing proceeds to step S25. Further, if it is determined in step S12 that the subject vehicle will pass through the intersection by "right turning", then the processing proceeds to step S17.

In step S17, the controller 30 generates a travel route image in which an advanceable range extending from the present position of the subject vehicle to the center of the intersection is superimposed and displayed in the second color. The controller 30 causes the display device 31 to display a display image including the generated travel route image (refer to FIG. 4C).

Figure 7C:
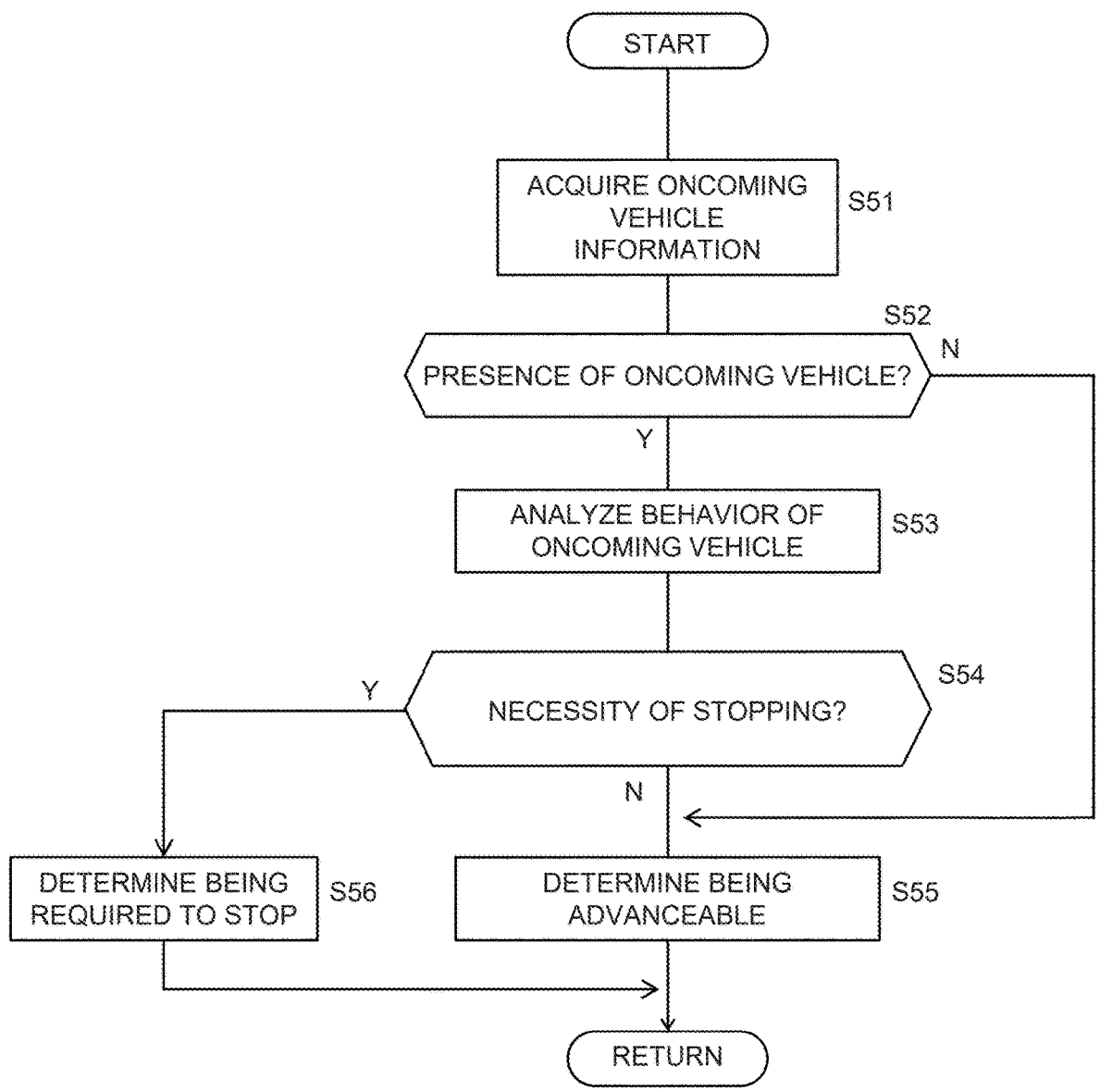
FIG. 7C is an exemplary subroutine illustrating safety check processing for an oncoming vehicle.

In step S18, the controller 30 performs safety check for the oncoming vehicle. When the processing proceeds to step S18, the controller 30 executes the subroutine illustrated in FIG. 7C. FIG. 7C is an exemplary subroutine illustrating safety check processing for the oncoming vehicle.

In step S51, the controller 30 acquires the oncoming vehicle information including presence or absence of the oncoming vehicle detected by the distance measuring device 13, relative position of the oncoming vehicle with respect to the subject vehicle, and relative distance and relative speed between the subject vehicle and the oncoming vehicle. In step S52, the controller 30 determines, from the oncoming vehicle information, whether the oncoming vehicle is present. If the determination made by the controller 30 is affirmative, then the processing proceeds to step S53. If the determination made by the controller 30 is negative, then the processing proceeds to step S55.

When the determination made by the controller 30 is affirmative in step S52, the processing proceeds to step S53. In step S53, the controller 30 analyzes the behavior of the oncoming vehicle based on the oncoming vehicle information. For example, the controller 30 calculates the time to collision until the subject vehicle collides with the oncoming vehicle, with reference to the relative distance and relative speed between the subject vehicle and the oncoming vehicle.

In step S54, the controller 30 determines, based on the result of step S53, whether stopping the subject vehicle at the center of the intersection is necessary. For example, when the time to collision calculated in step S53 is less than a predetermined threshold, the controller 30 determines that stopping the subject vehicle at the center of the intersection is necessary. On the other hand, when the time to collision calculated in step S53 is equal to or longer than predetermined threshold, the controller 30 determines that stopping the subject vehicle at the center of the intersection is unnecessary. If the determination made by the controller 30 is negative, then the processing proceeds to step S55. If the determination made by the controller 30 is affirmative, then the processing proceeds to step S56.

When the determination made by the controller 30 is negative in step S52 or step S54, the processing proceeds to step S55. In step S55, the controller 30 confirms that the subject vehicle can turn right (advance) through the intersection and determines that the safety check for the oncoming vehicle has been completed. On the other hand, when the determination made by the controller 30 is affirmative in step S54, the processing proceeds to step S56. In step S56, the controller 30 confirms that stopping the subject vehicle at the center of the intersection is necessary, and determines that the safety check for the oncoming vehicle is not completed yet. When the processing in step S55 or step S56 terminates, the processing exits the subroutine of FIG. 7C and proceeds to step S19 of FIG. 6.

In step S19 of FIG. 6, the controller 30 confirms the result of the safety check for the oncoming vehicle. When the processing proceeds from step S55 to step S19 in FIG. 7C, the controller 30 determines that the safety check for the oncoming vehicle has been completed. On the other hand, when the processing proceeds from step S56 to step S19 in FIG. 7C, the controller 30 determines that the safety check for the oncoming vehicle is not completed yet. If the determination made by the controller 30 is affirmative, then the processing proceeds to step S20. If the determination made by the controller 30 is negative, then the processing proceeds to step S23.

When the determination made by the controller 30 is negative in step S19, the processing proceeds to step S23. In step S23, the controller 30 executes deceleration processing and stop processing for causing the subject vehicle to stop at the center of the intersection (the boundary between the first color and the second color in the travel route image). Since the deceleration processing and stop processing by the controller 30 are similar to those in step S8, step S11, and step S16, the descriptions of these steps can be referred to and repetitive description will be omitted. When the processing of step S23 terminates and the subject vehicle stops at the center of the intersection, the processing returns to step S18. In this case, while the subject vehicle stops at the center of the intersection, the controller 30 performs the safety check for the oncoming vehicle again according to the subroutine of FIG. 7C.

When the determination made by the controller 30 is affirmative in step S19, the processing proceeds to step S20. In step S20, the controller 30 generates a travel route image in which an advanceable range extending from the present position of the subject vehicle to a point closer to the pedestrian crossing being a right-turn destination is superimposed and displayed in the second color. The controller 30 causes the display device 31 to display a display image including the generated travel route image (refer to FIG. 4D).

In step S21, the controller 30 performs safety check for the pedestrian. When the processing proceeds to step S21, which is similar to step S9 and step S14, the controller 30 executes the subroutine illustrated in FIG. 7B. Since the subroutine of FIG. 7B has already been described, repetitive description will be omitted. When the processing of step S45 or step S46 in FIG. 7B terminates, the processing exits the subroutine of FIG. 7B and proceeds to step S22 of FIG. 6.

In step S22 of FIG. 6, the controller 30 confirms the result of the safety check for the pedestrian. Since step S22 corresponds to step S10 and step S15, the descriptions of step S10 and step S15 can be referred to and repetitive description will be omitted. If the determination made by the controller 30 is affirmative, then the processing proceeds to step S25. If the determination made by the controller 30 is negative, then the processing proceeds to step S24.

When the determination made by the controller 30 is negative in step S22, the processing proceeds to step S24. In step S24, the controller 30 executes deceleration processing and stop processing for causing the subject vehicle to stop before reaching the pedestrian crossing being a right-turn destination (the boundary between the first color and the second color in the travel route image). Since the deceleration processing and stop processing by the controller 30 are similar to those in step S8, step S11, step S15, and step S23, the descriptions of these steps can be referred to and repetitive description will be omitted. When the processing of step S24 terminates and the subject vehicle stops before reaching the pedestrian crossing being the right-turn destination, the processing returns to step S21. In this case, while the subject vehicle stops before reaching the pedestrian crossing being the right-turn destination, the controller 30 performs the safety check for the pedestrian again according to the subroutine of FIG. 7B.

When the determination made by the controller 30 is affirmative in step S15 or step S22, or when the controller 30 determines in step S12 that the subject vehicle will pass through the intersection by "straight going", the processing proceeds to step S25. In step S25, the controller 30 generates a travel route image in which an advanceable range extending from the present position of the subject vehicle to a point beyond the intersection is superimposed and displayed in the second color. The controller 30 causes the display device 31 to display a display image including the generated travel route image. When the processing proceeds from step S12 to step S25, the travel route image is an image of a straight route and is also an image displayed in the second color up to a point beyond the intersection. Further, when the processing proceeds from step S15 to step S25, the travel route image is an image displayed in the second color up to a point beyond the pedestrian crossing after the left turn. Further, when the processing proceeds from step S22 to step S25, the travel route image is an image displayed in the second color up to a point beyond the pedestrian crossing after the right turn.

In step S26, the controller 30 determines whether to terminate the display control. The condition for terminating the display control is, for example, whether the route to the destination is displayed in the second color. In this case, by determining whether the travel route image includes the destination, the controller 30 determines whether to terminate the display control. When the route to the destination is displayed in the second color, the controller 30 makes an affirmative determination. On the other hand, when the route to the destination is not displayed in the second color, the controller 30 makes a negative determination. If the determination made by the controller 30 is affirmative, then the controller 30 terminates the display control illustrated in FIG. 6. If the determination made by the controller 30 is negative, then the processing returns to step S2 in which the controller 30 executes display control for the display image displayed by the display device 31.

As described above, the display control device according to the present embodiment includes the controller 30 that performs display control for the display image. The controller 30 acquires the travel route of the subject vehicle having the autonomous traveling function (the travel route acquisition unit 60), acquires the information on the ambient environment of the subject vehicle (the signal information acquisition unit 51, the preceding vehicle speed acquisition unit 52, the oncoming vehicle information acquisition unit 53, and the pedestrian information acquisition unit 54), performs, based on the state of surroundings of the subject vehicle, safety check required for the subject vehicle to travel on the travel route by autonomous traveling (the stop possibility calculation unit 58), and causes the display device 31 to display the travel route image including the advanceable range being completed in safety check and other non-advanceable range that are distinguished on the travel route (the display image generation unit 62). By visually recognizing the travel route image, viewers of the display device 31 can intuitively grasp the range for which the safety check has been completed. Further, by referring to the boundary between the advanceable range and the non-advanceable range, viewers of the display device 31 can intuitively grasp a position possibly becoming the stop position.

Further, in the present embodiment, the travel image displayed by the controller 30 is an image in which the advanceable range and the non-advanceable range are differentiated in at least any one of color, pattern, and brightness. This enables viewers of the display device 31 to easily grasp the range for which the safety check has been completed and give viewers a sense of security for autonomous traveling.

Further, in the present embodiment, the travel image displayed by the controller 30 is an image in which completion display of the safety check is superimposed on the advanceable range. This enables viewers of the display device 31 to easily grasp the range for which the safety check has been completed and give viewers a sense of security for autonomous traveling.

Further, in the present embodiment, the controller 30, when it is determined that there is a pedestrian who may cross the travel route of the subject vehicle, based on the state of surroundings of the subject vehicle, performs safety check for the pedestrian. Further, the controller 30, when it is determined that there is an oncoming vehicle that may cross the travel route of the subject vehicle, based on the state of surroundings of the subject vehicle, performs safety check for the oncoming vehicle. Restricting the timing for performing the safety check can reduce the calculation load of the controller 30.

Further, in the present embodiment, the controller 30 acquires information on present position of the subject vehicle, acquires information on stop determination position at which the safety check is possibly performed in a state where the subject vehicle is stopped, and performs the safety check when the distance between the present position of the subject vehicle and the stop determination position is less than a predetermined threshold. This makes it possible to determine the necessity of stopping the subject vehicle at the stop determination position before the subject vehicle reaches the stop determination position. It is possible to prevent the subject vehicle from stopping at the stop determination position even in the advanceable state, thereby preventing viewers of the display device 31 from losing a sense of security for autonomous traveling.

Further, in the present embodiment, the controller 30 determines the necessity of stopping the subject vehicle at the stop determination position. When it is determined that stopping the subject vehicle at the stop determination position is necessary, the controller 30 performs displaying the travel route image that is not changed in boundary between the advanceable range and the non-advanceable range, compared to the travel route image before the safety check. This enables viewers of the display device 31 to predict that the subject vehicle will stop at the boundary between the advanceable range and the non-advanceable range and recognize the presence of a factor that causes the subject vehicle to stop.

Further, in the present embodiment, the controller 30 performs, when it is determined that stopping the subject vehicle at the stop determination position is necessary, safety check for an object range extending from the present position of the subject vehicle to the stop determination position. Since the subject vehicle decelerates in order to stop at the stop determination position, limiting the range to be subjected to the safety check can reduce the calculation load of the controller 30.

Further, in the present embodiment, the controller 30 performs, when it is determined that stopping the subject vehicle at the stop determination position is unnecessary, displaying the travel route image in which the boundary between the advanceable range and the non-advanceable range is moved toward a direction along which the subject vehicle advances, compared to the travel route image before the safety check. This enables viewers of the display device 31 to intuitively grasp that the subject vehicle will pass through the stop determination position and recognize the absence of a factor that causes the subject vehicle to stop.

Further, in the present embodiment, the stop determination position includes at least any one of an intersection, a pedestrian crossing, a junction, a traffic light, and a stop line. This makes it possible to increase the number of locations and peripheral environments where viewers can know the state of safety check during autonomous traveling adequately.

Further, in the present embodiment, when performing the safety check for multiple stopping factors existing around the subject vehicle, the controller 30 performs stopping factor safety check for each stopping factor. This enables viewers of the display device 31 to recognize the presence of a stopping factor through the travel route image, even when there is a stopping factor that is difficult for the viewers to notice.

Further, in the present embodiment, the controller 30 causes the display device 31 to display the advanceable range identical in display form regardless of the type of each stopping factor. This enables viewers of the display device 31 to easily grasp how a travelable range has changed, when the travelable range has changed, and intuitively grasp that the safety check has been performed.

Further, in the present embodiment, when the subject vehicle turns right, the controller 30 performs safety check for the oncoming vehicle, and upon completion of the safety check for the oncoming vehicle, performs safety check for the pedestrian. Even in the scene of right turning that requires safety check for oncoming vehicles and pedestrians, viewers of the display device 31 can intuitively grasp that the safety check is being performed step by step.

Further, in the present embodiment, the display device 31 is the display mounted on the subject vehicle. Therefore, occupants of the subject vehicle can intuitively grasp the range for which the safety check has been completed by visually recognizing the travel route image. Further, the occupants can intuitively grasp the position possibly becoming the stop position by referring to the boundary between the advanceable range and the non-advanceable range. This can give the occupants a sense of security for autonomous traveling.

In addition, in the present embodiment, the controller 30 acquires the information on the ambient environment of the subject vehicle from the high-precision map storage unit 12 storing the high-precision map information, the distance measuring device 13 and the camera 14 that detect surroundings of the subject vehicle, and the communicator 15 that can communicate with other vehicles through vehicle-to-vehicle communications. This makes it possible to prevent the subject vehicle from running out the information on the ambient environment required for the safety check. If there is a management server that manages traveling states (e.g., present vehicle speed and present position) of other vehicles, the controller 30 may acquire information on the ambient environment of the subject vehicle including the traveling states of other vehicles existing around the subject vehicle, from the management server. The controller 30 may acquire the information on the ambient environment of the subject vehicle from at least any one of the high-precision map storage unit 12, the distance measuring device 13, the camera 14, the communicator 15, and the above-described management server.

It should be noted that the description of the above embodiment is for facilitating the understanding of the present invention and is not intended to limit the present invention. Accordingly, respective elements disclosed in the above embodiment are meant to include all changes of design and equivalents thereof that fall within the technical scope of the present invention.

For example, in the above-described embodiment, the display mounted on the subject vehicle is an example of the display device 31, but the display device 31 is not limited only to some types being mounted on the subject vehicle. For example, when there is a monitoring center located outside the subject vehicle, and a person in charge of monitoring is monitoring autonomous traveling of the subject vehicle, the display device 31 may be a display equipped for a monitoring terminal. Further, for example, the display device 31 may be a display of a portable terminal carried by an occupant of the subject vehicle or a person in charge of monitoring. When the display device 31 is configured by any device located outside the subject vehicle, the controller 30 transmits, via the communicator 15, the display image including the travel route image to the display device 31 outside the subject vehicle. It suffices that the display device 31 includes any one of the above-described display mounted on the subject vehicle, the display equipped for the monitoring terminal, and the display of the portable terminal.

Further, for example, in the above-described embodiment, oncoming vehicles and pedestrians are described as exemplary moving objects that may cross the travel route of the subject vehicle. However, the moving objects may be bicycles and motorcycles. Further, for example, if it is determined, based on detection results obtained by the distance measuring device 13 and the camera 14, that there is an obstacle (e.g., a parked vehicle, a stopped vehicle, or a construction site) in the advancing direction of the subject vehicle on the travel route of the subject vehicle, the controller 30 may regard this obstacle as a stopping factor and perform safety check for the obstacle. It is possible to increase the number of locations and peripheral environments where viewers can appropriately know the state of safety check during autonomous traveling. The controller 30 may be configured to let occupants select the manual driving mode by voice or warning light when it is determined that the obstacle hinders the advancement of the subject vehicle.

Further, for example, in the above-described embodiment, the exemplary configuration in which the controller 30 causes the display device 31 to display the advanceable range identical in display form regardless of the type of each stopping factor has been described. However, the display form of the advanceable range may be differentiated according to the type of each stopping factor. Hereinafter, an exemplary flowchart of FIG. 6 will be described below. For example, when the subject vehicle turns right and passes through an intersection, the controller 30 may display, in step S20, an advanceable range extending from the present position of the subject vehicle to a point closer to the pedestrian crossing in the right-turn destination in a color different from the first color and the second color. This makes it easier for viewers of the display device 31 to intuitively grasp that the safety check for the oncoming vehicle has been performed. Displaying the advanceable range differentiated in display form according to the type of each stopping factor enables viewers to easily grasp the type of each stopping factor for which the safety check has been performed.

Further, for example, in the above-described embodiment, the exemplary configuration in which the travel route calculation unit 59 calculates the travel route of the subject vehicle has been described. However, the calculation of the travel route may be performed by a device other than the controller 30. For example, the controller 30 may be configured so as to acquire, via the communicator 15, the travel route of the subject vehicle calculated by the above-described monitoring center.

Further, for example, in the above-described embodiment, FIG. 6 and FIGS. 7A to 7C are used to describe the exemplary display control method in the case where the autonomously traveling subject vehicle passes through the intersection. However, the display control method according to the present invention is not limited to this example. For example, in the safety check processing for the pedestrian illustrated in FIG. 7B, as the processing in step S43 and step S44, the determination method based on the time to collision has been exemplarily described. However, the safety check for the pedestrian may be performed by other determination methods. In step S43 and step S44, the controller 30 may determine the necessity of stopping the subject vehicle based on the position of the pedestrian in the pedestrian crossing and the moving direction of the pedestrian relative to the subject vehicle. For example, the controller 30 may divide the pedestrian crossing into a plurality of blocks of a predetermined size to identify the position of the pedestrian, and may determine the necessity of stopping the subject vehicle according to a combination of the moving direction of the pedestrian relative to the subject vehicle and each block.

Figure 8:
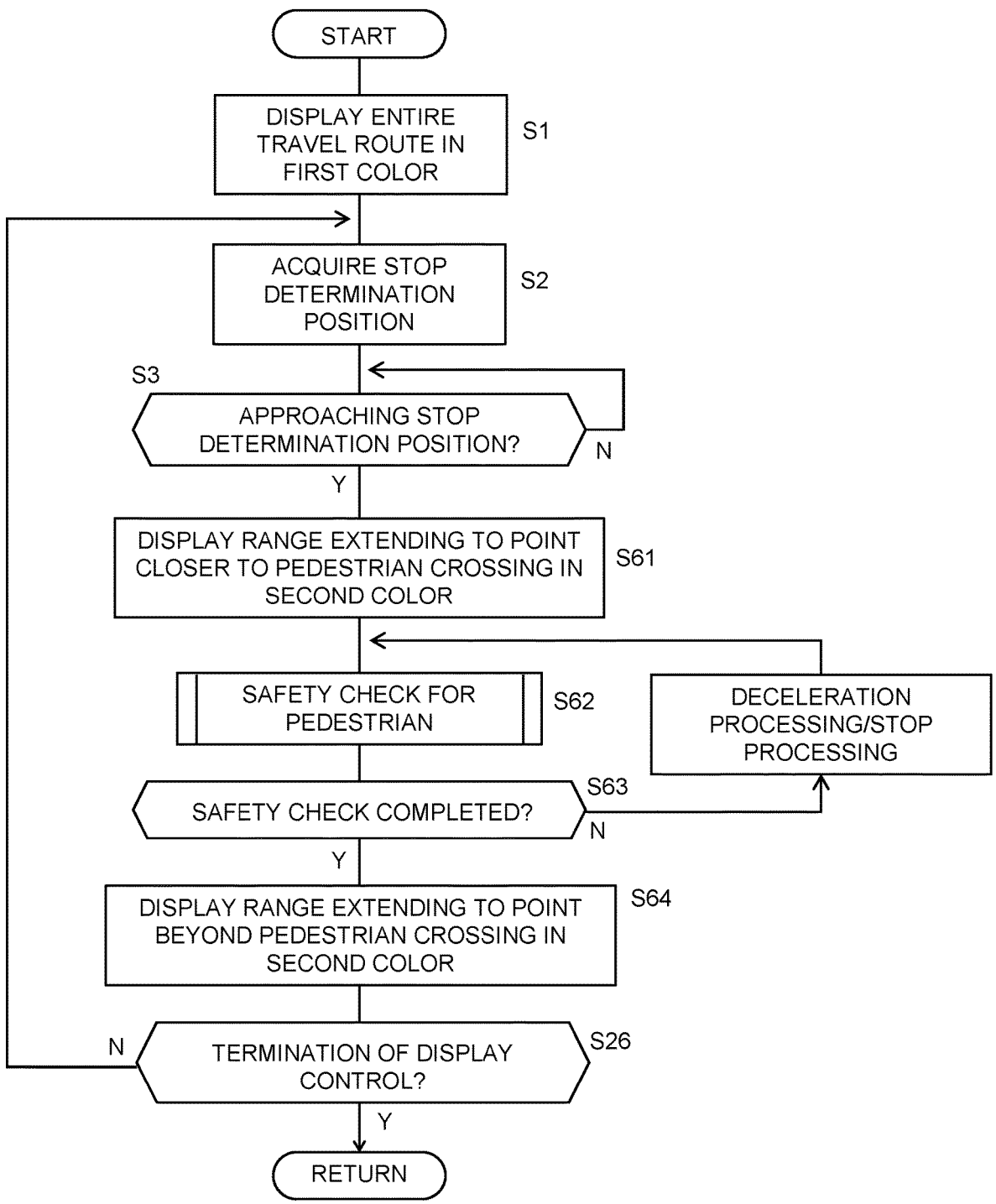
FIG. 8 is an exemplary flowchart illustrating a display control method in a case where the subject vehicle, while autonomous traveling, passes through a pedestrian crossing with no traffic light on a straight road.

Further, FIG. 8 illustrates an exemplary display control method in a case where the subject vehicle, while autonomous traveling, passes through a pedestrian crossing with no traffic light on a straight road. Respective steps of FIG. 8 are similar in processing contents to the steps illustrated in FIG. 6 and descriptions thereof will be omitted. As illustrated in FIG. 8, in the display control method according to the present invention, even when the autonomous traveling subject vehicle passes through a pedestrian crossing with no traffic light on a straight road, it is possible to enable viewers of the display device 31 to intuitively grasp the range for which the safety check has been completed.

Further, in the present embodiment, the exemplary case in which vehicles are assumed to travel on the left side has been described. However, the display control device and the display control method according to the present invention can be implemented even when vehicles travel on the right side. Although detailed description is omitted, for example, in the flowchart illustrated in FIG. 6, by adjusting the processing for the display with the second color depending on the determination result of step S12 (step S13, step S17, step S20, and step S25) for the traveling on the right-side, the display control device and the display control method according to the present invention can be implemented even when vehicles travel on the right side.

REFERENCE SIGNS LIST

1: driving assistance apparatus
10: ambient environment sensor group
11: positioning device
12: high-precision map storage unit
13: distance measuring device
14: camera
15: communicator
20: vehicle sensor group
21: vehicle speed sensor
22: acceleration sensor
23: gyro sensor
24: steering angle sensor
25: accelerator sensor
26: brake sensor
30: controller
31: display device
32: processor
33: storage device
40: vehicle control actuator group
41: steering actuator
42: accelerator opening actuator
43: brake control actuator
50: subject vehicle speed acquisition unit
51: signal information acquisition unit
52: preceding vehicle speed acquisition unit
53: oncoming vehicle information acquisition unit
54: pedestrian information acquisition unit
55: stop determination position acquisition unit
56: subject vehicle position calculation unit
57: approach determination unit
58: stop possibility calculation unit
59: travel route calculation unit
60: travel route acquisition unit
61: HMI drawing unit
62: display image generation unit

The invention claimed is:
1. A display control device comprising a controller configured to:
    acquire a travel route of a subject vehicle having an autonomous traveling function;
    acquire information on a state of surroundings of the subject vehicle;
    acquire information on a stop determination position;
    determine, based on the state of surroundings, whether or not the subject vehicle can advance along the travel route by autonomous traveling by determining necessity of stopping the subject vehicle at the stop determination position;
    control a display device to display a display image, the display image comprising a travel route image being a portion of the travel route immediately ahead of the subject vehicle, wherein:
        the travel route image includes a boundary that is bounded by the travel route image,
        a first range extends from the subject vehicle to the boundary,
        a second range is defined as the portion of the travel route image that does not include the first range,
        the first range being a range in which the subject vehicle is determined to be able to advance,
        the second range being another range in which the subject vehicle is determined to be unable to advance, and
        the first range and the second range are visually distinguishable from each other in the display image,
    when stopping the subject vehicle at the stop determination position is determined to be unnecessary, perform displaying, as part of the display image, the travel route image in which the boundary is moved toward a direction along which the subject vehicle advances, compared to the travel route image before determining whether or not the subject vehicle at the stop determination position can advance.

2. The display control device according to claim 1, wherein the first range and the second range are visually distinguishable by at least any one of color, pattern, and brightness.

3. The display control device according to claim 1, wherein the controller, when a moving object possibly crossing the travel route is determined to be present, based on the state of surroundings, is configured to determine whether or not the subject vehicle needs to stop for the moving object.

4. The display control device according to claim 1, wherein the controller, when an obstacle is determined to be present on the travel route, based on the state of surroundings, is configured to determine whether or not the subject vehicle needs to stop for the obstacle.

5. The display control device according to claim 1, wherein the controller is configured to:
acquire information on present position of the subject vehicle; and
perform the determination whether or not the subject vehicle can advance when a distance between the present position of the subject vehicle and the stop determination position is less than a predetermined threshold.

6. The display control device according to claim 5, wherein the controller is configured to:
perform, when stopping the subject vehicle at the stop determination position is determined to be necessary, displaying the travel route image which is not changed in boundary between the first range and the second range, compared to the travel route image before determining whether or not the subject vehicle at the stop determination position can advance.

7. The display control device according to claim 5, wherein the stop determination position includes at least any one of an intersection, a pedestrian crossing, a junction, a traffic light, and a stop line.

8. The display control device according to claim 1, wherein the controller, when multiple stopping factors exist around the subject vehicle, is configured to perform the determination whether or not the subject vehicle can advance for the stopping factor for each of the stopping factors.

9. The display control device according to claim 8, wherein the controller configured to control the display device to display the first range differentiated in display form according to type of the stopping factor.

10. The display control device according to claim 8, wherein the controller configured to control the display device to the first range identical in display form regardless of type of the stopping factor.

11. The display control device according to claim 8, wherein the controller is further configured to:
determine whether or not the subject vehicle can advance for an oncoming vehicle when the subject vehicle turns left or right; and
performs the determination whether or not the subject vehicle can advance for a pedestrian when determine that the subject vehicle can advance.

12. The display control device according to claim 1, wherein the display device includes any one of a display mounted on the subject vehicle, a display provided in a monitoring terminal for monitoring traveling of the subject vehicle, and a display of a portable terminal.

13. The display control device according to claim 1, wherein the controller configured to acquire information on the state of surroundings from at least any one of a storage device storing map information, a sensor detecting the surroundings of the subject vehicle, a communicator capable of communicating with other vehicles, and a server managing information on traveling state of the other vehicles.

14. The display control device according to claim 1, wherein the controller configured to determine based on the state of surroundings, whether or not the subject vehicle can advance along the travel route without stopping by autonomous traveling,
the first range is a range on the travel route in which the subject vehicle is determined to be able to advance without stopping.

15. A display control device comprising a controller configured to:
acquire a travel route of a subject vehicle having an autonomous traveling function;
acquire information on a state of surroundings of the subject vehicle;
acquire information on a stop determination position;
determine, based on the state of surroundings, necessity of stopping the subject vehicle at the stop determination position;
when stopping the subject vehicle at the stop determination position is determined to be necessary, perform the determination whether or not the subject vehicle can advance for an object range extending from the present position of the subject vehicle to the stop determination position; and
control the display device to display a display image, the display image comprising a travel route image being a portion of the travel route immediately ahead of the subject vehicle, wherein:
the travel route image includes a boundary that is bounded by the travel route image,
a first range extends from the subject vehicle to the boundary,
a second range is defined as the portion of the travel route image that does not include the first range,
the first range being a range in which the subject vehicle is determined to be able to advance,
the second range being another range in which the subject vehicle is determined to be unable to advance, and
the first range and the second range are visually distinguishable from each other in the display image.

16. A display control method executable by a controller, comprising:
acquiring a travel route of a subject vehicle having an autonomous traveling function;
acquiring information on a state of surroundings of the subject vehicle;
acquiring information on a stop determination position;
determining, based on the state of surroundings, whether or not the subject vehicle can advance along the travel route by autonomous traveling by determining necessity of stopping the subject vehicle at the stop determination position; and
controlling a display device to display a display image, the display image comprising a travel route image being a portion of the travel route immediately ahead of the subject vehicle, wherein:
the travel route image includes a boundary that is bounded by the travel route image, a first range extends from the subject vehicle to the boundary, a second range is defined as the portion of the travel route image that does not include the first range, the first range being a range in which the subject vehicle is determined to be able to advance, the second range being another range in which the subject vehicle is determined to be unable to advance, and the first range and the second range are visually distinguishable from each other in the display image, when stopping the subject vehicle at the stop determination position is determined to be unnecessary, perform displaying, as part of the display image, the travel route image in which the boundary is moved toward a direction along which the subject vehicle advances, compared to the travel route image before determining whether or not the subject vehicle at the stop determination position can advance.

* * * * *